US007155712B2

(12) United States Patent
Takimoto

(10) Patent No.: US 7,155,712 B2
(45) Date of Patent: Dec. 26, 2006

(54) INFORMATION PROCESSING SYSTEM ENABLING DYNAMICALLY LOADING OR REPLACING PROGRAM COMPONENT IN MEMORY ALLOCATED TO ACTIVATED PROCESS

(75) Inventor: Minoru Takimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 09/729,015

(22) Filed: Dec. 4, 2000

(65) Prior Publication Data
US 2001/0052034 A1    Dec. 13, 2001

(30) Foreign Application Priority Data
Mar. 15, 2000    (JP) .............................. 2000-077814

(51) Int. Cl.
G06F 9/44    (2006.01)
(52) U.S. Cl. .................................... 717/170
(58) Field of Classification Search ................ 717/121, 717/153, 158, 168–178; 709/330, 316, 315, 709/221; 707/10, 8
See application file for complete search history.

(56) References Cited
U.S. PATENT DOCUMENTS

| | | | | |
|---|---|---|---|---|
| 5,410,703 A | * | 4/1995 | Nilsson et al. | 717/168 |
| 5,555,418 A | * | 9/1996 | Nilsson et al. | 717/153 |
| 5,586,304 A | * | 12/1996 | Stupek et al. | 717/170 |
| 5,732,275 A | * | 3/1998 | Kullick et al. | 717/170 |
| 5,761,499 A | * | 6/1998 | Sonderegger | 707/10 |
| 5,805,891 A | * | 9/1998 | Bizuneh et al. | 717/121 |
| 5,845,077 A | * | 12/1998 | Fawcett | 709/221 |
| 5,909,581 A | * | 6/1999 | Park | 717/170 |
| 5,940,827 A | * | 8/1999 | Hapner et al. | 707/8 |
| 5,974,454 A | * | 10/1999 | Apfel et al. | 709/221 |
| 6,113,652 A | * | 9/2000 | Lysik et al. | 717/170 |

(Continued)

FOREIGN PATENT DOCUMENTS

EP    0 875 826    11/1998

(Continued)

OTHER PUBLICATIONS

Yasuhiro Sugiyama, et al. "A Mechanism for Runtime Software Evolution Based on Dynamic Version Management" May 15, 1998, ISSN 0919-6072.

(Continued)

Primary Examiner—Kakali Chaki
Assistant Examiner—Trenton J. Roche
(74) Attorney, Agent, or Firm—Katten Muchin Rosenman LLP

(57) ABSTRACT

An information processing system including at least one terminal and at least one program execution apparatus. Each terminal transmits a message containing version information indicating a program version to a program execution apparatus. Each program execution apparatus stores one or more program components, and holds in a pre-transfer information management table information on the program components. Each program execution apparatus includes a memory allocated to an activated process and temporarily storing at least one program component for execution; and also includes a post-transfer information management table holding information one or more program components. When each program execution apparatus receives from a terminal a message containing version information, a program executing unit in the program execution apparatus dynamically links one of the program components and corresponding to version information in the received message, to the memory, enabling execution of the program components in the process.

26 Claims, 20 Drawing Sheets

U.S. PATENT DOCUMENTS

| | | | |
|---|---|---|---|
| 6,157,961 A * | 12/2000 | Kessler et al. | 709/315 |
| 6,289,510 B1 * | 9/2001 | Nakajima | 717/170 |
| 6,336,148 B1 * | 1/2002 | Doong et al. | 709/316 |
| 6,347,398 B1 * | 2/2002 | Parthasarathy et al. | 717/178 |
| 6,353,926 B1 * | 3/2002 | Parthesarathy et al. | 717/170 |
| 6,381,735 B1 * | 4/2002 | Hunt | 717/158 |
| 6,493,768 B1 * | 12/2002 | Boutcher | 709/330 |

FOREIGN PATENT DOCUMENTS

| | | |
|---|---|---|
| JP | 62-236045 | 10/1987 |
| JP | 5-307478 | 11/1993 |
| JP | 5-324303 | 12/1993 |
| JP | 8-194671 | 7/1996 |
| JP | 8-335212 | 12/1996 |
| JP | 9-062500 | 3/1997 |
| JP | 10312274 | 11/1998 |
| JP | 11-7315 | 1/1999 |

OTHER PUBLICATIONS

"Practice! Activate CCD Camera with USB Connection".

* cited by examiner

FIG. 7 (A)

```
     ┌ namespace XXX 1_01 {
     │     class XXX  {
Na   │       class YYY {
     │       public:
             void foo (CORBA::ULong major _version,
                       CORBA::ULong minor _version,
                       ···parameter _1
                       ...
                       ···parameter_n);
                ...
               };
             };
```

FIG. 7 (B)

```
     ┌ namespace XXX 1_02 {
     │     class XXX  {
Nb   │       class YYY {
     │       public:
             void foo (CORBA::ULong major _version,
                       CORBA::ULong minor _version,
                       ···parameter _1
                       ...
                       ···parameter_n);
                ...
               };
             };
```

FIG. 8

T1' COMPONENT-VERSION-INFORMATION DEFINITION FILE

| VERSION OF ENTIRE SYSTEM (T1a) | | NAME OF BEHAVIOR-PROCESSING COMMON LIBRARY (T1b) | VERSION OF BEHAVIOR-PROCESSING COMMON LIBRARY (T1c) | PROCESS NAME (T1d) |
|---|---|---|---|---|
| MAJOR NUMBER | MINOR NUMBER | | | |
| 1 | 01 | libAPL-A.so | 1.01 | process-1 |
| 1 | 01 | libAPL-B.so | 1.01 | process-2 |
| 1 | 01 | libAPL-C.so | 1.01 | process-2 |
| 1 | 01 | libAPL-X.so | 1.01 | process-n |
| 1 | 02 | libAPL-A.so | 1.02 | process-1 |
| 1 | 02 | libAPL-B.so | 1.01 | process-2 |
| 1 | 02 | libAPL-C.so | 1.02 | process-2 |
| 1 | 02 | libAPL-X.so | 1.02 | process-n |
| 1 | 03 | libAPL-A.so | 1.02 | process-1 |
| 1 | 03 | libAPL-B.so | 1.02 | process-2 |
| 1 | 03 | libAPL-C.so | 1.03 | process-2 |
| 1 | 03 | libAPL-X.so | 1.03 | process-n |

FIG. 10

T2' COMPONENT-VERSION-INFORMATION MANAGEMENT TABLE

| VERSION OF ENTIRE SYSTEM (T2a) | | NAME OF BEHAVIOR-PROCESSING COMMON LIBRARY (T2b) | VERSION OF BEHAVIOR-PROCESSING COMMON LIBRARY (T2c) | FLAG (T2d) | ADDRESS OF FUNCTION TABLE (T2e) |
|---|---|---|---|---|---|
| MAJOR NUMBER | MINOR NUMBER | | | | |
| 1 | 01 | libAPL-A.so | 1.01 | Y | 0x00012345 |
| 1 | 02 | libAPL-A.so | 1.02 | Y | 0x00023456 | t(1.01)

| FUNCTION NAME | FUNCTION ADDRESS |
|---|---|
| MOD_1_01::OBJ_A::foo_1 | 0x00123456 |
| MOD_1_01::OBJ_A::foo_2 | 0x00234567 |
| MOD_1_01::OBJ_A::foo_3 | 0x00345678 |
| MOD_1_01::OBJ_A::foo_n | 0x00456789 | t(1.02)

| FUNCTION NAME | FUNCTION ADDRESS |
|---|---|
| MOD_1_02::OBJ_A::foo_1 | 0x01123456 |
| MOD_1_02::OBJ_A::foo_2 | 0x01234567 |
| MOD_1_02::OBJ_A::foo_3 | 0x01345678 |
| MOD_1_02::OBJ_A::foo_n | 0x01456789 |

```
module XXX {
  interface YYY {
    void foo (in unsigned long major_version,
              in unsigned long minor_version,
              in boolean eval,
                 ···parameter_1       ⟵ EVALUATION FLAG
                 ...
                 ···parameter_n);
    ...
  };
};
```

FIG. 15

```
namespace XXX 1_01 {
  class XXX  {
    class YYY {
    public:
        void foo (CORBA::ULong major_version,
                  CORBA::ULong minor_version,
                  CORBA::Boolean eval,   ← EVALUATION FLAG
                  ···parameter_1
                  ...
                  ···parameter_n);
        ...
    };
  };
```

EVALUATION FLAG

T2-2 COMPONENT-VERSION-INFORMATION MANAGEMENT TABLE

| VERSION OF ENTIRE SYSTEM (T2a) | | NAME OF BEHAVIOR-PROCESSING COMMON LIBRARY (T2b) | VERSION OF BEHAVIOR-PROCESSING COMMON LIBRARY (T2c) | FLAG (T2d) | REFERENCE COUNT (T2f) | EVALUATION COUNT (T2g) | ADDRESS OF FUNCTION TABLE (T2e) |
|---|---|---|---|---|---|---|---|
| MAJOR NUMBER | MINOR NUMBER | | | | | | |
| 1 | 01 | libAPL-A.so | 1.01 | N | 0 | 0 | 0x0 |
| 1 | 02 | libAPL-A.so | 1.02 | Y | 12 | 0 | 0x00012345 |
| 1 | 03 | libAPL-A.so | 1.03 | Y | 7 | 0 | 0x00023456 | t(1.02)

| FUNCTION NAME | FUNCTION ADDRESS |
|---|---|
| MOD_1_02::OBJ_A::foo_1 | 0x00123456 |
| MOD_1_02::OBJ_A::foo_2 | 0x00234567 |
| MOD_1_02::OBJ_A::foo_3 | 0x00345678 |
| MOD_1_02::OBJ_A::foo_n | 0x00456789 | t(1.03)

| FUNCTION NAME | FUNCTION ADDRESS |
|---|---|
| MOD_1_03::OBJ_A::foo_1 | 0x01123456 |
| MOD_1_03::OBJ_A::foo_2 | 0x01234567 |
| MOD_1_03::OBJ_A::foo_3 | 0x01345678 |
| MOD_1_03::OBJ_A::foo_n | 0x01456789 |

INFORMATION PROCESSING SYSTEM ENABLING DYNAMICALLY LOADING OR REPLACING PROGRAM COMPONENT IN MEMORY ALLOCATED TO ACTIVATED PROCESS

BACKGROUND OF THE INVENTION

1) Field of the Invention

The present invention relates to an information processing system. In particular, the present invention relates to a distributed processing system realizing an N-tier client-server environment. The present invention also relates to a method for updating a program component loaded in a server in an N-tier client-server environment.

2) Description of the Related Art

Recently, communication networks are required to have various functions. In order to provide various services to customers, manage operations, and maintain such communication networks, it is necessary to timely update versions of programs in the communication networks. In particular, in backbone networks, it is impossible to stop the entire system or a process executed in the system. Therefore, the programs must be dynamically replaced during regular operations of the communication networks.

According to a conventional dynamic program replacement technique, a new version of a program is queued, and then replaces an old version of the program. Thereafter, communication is restarted. According to another conventional dynamic program replacement technique, one or more requests for execution of an old version of a program are cancelled, and then the old version of the program is replaced with a new version of the program. According to the above conventional techniques, it is not necessary to stop the entire process or the entire system. However, transaction processing is temporarily blocked or stopped.

On the other hand, distributed processing systems are widely used in the communication networks. The so-called client-server system is a typical example of the distributed processing system. Currently, the so-called N-tier client-server system is considered to be a next-generation client-server system, and is under development. In the N-tier client-server system, more than one tier is formed above a client tier.

However, the conventional dynamic program replacement techniques are proposed for merely replacing an old version of a program with a new version of the program. Therefore, the conventional dynamic program replacement techniques cannot achieve dynamic replacement of a plurality of old versions of a plurality of software components distributed over a plurality of computers forming an N-tier client-server system, with new versions of the plurality of software components, so as to maintain synchronization between the versions of the programs in the plurality of computers during the replacement.

SUMMARY OF THE INVENTION

An object of the present invention is to provide an information processing system which enables efficient, dynamic loading or replacement of a program component without service interruption.

Another object of the present invention is to provide a distributed processing system realizing an N-tier client-server environment, and enabling efficient, dynamic loading or replacement of a distributed object without service interruption.

A further object of the present invention is to provide a method for updating a program component loaded in a server in an N-tier client-server environment, whereby a program can be dynamically and efficiently loaded into the server, or a program loaded in the server can be dynamically and efficiently replaced, without service interruption.

(1) According to the first aspect of the present invention, there is provided an information processing system including at least one terminal apparatus and at least one program execution apparatus. Each of the at least one terminal apparatus comprises a message transmitting unit which transmits a message containing version information indicating a program version. Each of the at least one program execution apparatus comprises a message receiving unit which receives the message containing version information indicating a program version, from one of the at least one terminal apparatus, a program storing unit which stores one or more program components, a pre-transfer information management table which holds information on the one or more program components stored in the program storing unit, a program memory unit which is allocated to an activated process, and temporarily stores at least one program component transferred from the program storing unit, a post-transfer information management table which holds information on the at least one program component stored in the program memory unit, and a program executing unit which dynamically links one of the one or more program components corresponding to the version information contained in the message received by the message receiving unit, to the program memory unit, so as to enable execution of the one of the one or more program components in the process.

As described above, in the information processing system according to the first aspect of the present invention, a message containing information on a program version is transmitted to a program execution apparatus, and a program component corresponding to the information on the program version is dynamically linked to an activated process in the program execution apparatus so that the program can be executed. Therefore, a new version of software can be loaded into the program execution apparatus during execution of another version of software for transaction processing. That is, software can be dynamically and efficiently loaded into the program execution apparatus, or software loaded in the program execution apparatus can be dynamically and efficiently replaced, without stopping transaction.

The information processing system according to the first aspect of the present invention may have one or any possible combination of the following additional features (i) to (vii).

(i) The post-transfer information management table may indicate for each of the at least one program component a reference count which indicates the number of executions in which the each of the at least one program component are currently referred to.

(ii) When the information processing system according to the first aspect of the present invention has the above feature (i), the program executing unit may remove one of the at least one program component from the program memory unit when the reference count for the one of the at least one program component is zero, and information on a newer version of the one of the at least one program component is included in the post-transfer information management table.

(iii) The message received by the message receiving unit may further contain an evaluation flag which indicates whether or not a program component is under evaluation.

(iv) When the information processing system according to the first aspect of the present invention has the above feature (iii), the program executing unit may execute the program component for which the evaluation flag is contained in the message, in a separate process, when the evaluation flag indicates that the program component for which the evaluation flag is contained in the message is under evaluation.

(v) The post-transfer information management table may indicate for each of the at least one program component an evaluation count which indicates the number of evaluations which are currently performed on the each of the at least one program component.

(vi) When the information processing system according to the first aspect of the present invention has the above feature (v), the program executing unit may terminate execution of one of the at least one program component in a separate process when the evaluation count corresponding to the one of the at least one program component is zero.

(vii) The information processing system according to the first aspect of the present invention may further comprise a management apparatus which sets and manages the one or more program components stored in the program storing unit and the information on the one or more program components held in the pre-transfer information management table.

(2) According to the second aspect of the present invention, there is provided a terminal apparatus comprising: an interface unit which controls operations of inputting and outputting software; and a message transmitting unit which transmits a message containing version information indicating a program version.

The above message may further contain an evaluation flag which indicates whether or not a program component is under evaluation.

(3) According to the third aspect of the present invention, there is provided a program execution apparatus comprising: a message receiving unit which receives a message containing version information indicating a program version; a program storing unit which stores one or more program components; a pre-transfer information management table which holds information on the one or more program components stored in the program storing unit; a program memory unit which is allocated to an activated process, and temporarily stores at least one program component transferred from the program storing unit; a post-transfer information management table which holds information on the at least one program component stored in the program memory unit; and a program executing unit which dynamically links one of the one or more program components corresponding to the version information contained in the message received by the message receiving unit, to the program memory unit, so as to enable execution of the one of the one or more program components.

The terminal apparatus according to the second aspect of the present invention and the program execution apparatus according to the third aspect of the present invention are constituents of the information processing system according to the first aspect of the present invention.

The program execution apparatus according to the third aspect of the present invention may have one or any possible combination of the aforementioned additional features (i) to (vii).

(4) According to the fourth aspect of the present invention, there is provided a distributed processing system including at least one client apparatus and a plurality of server apparatuses, and realizing an N-tier client-server environment. Each of the at least one client apparatus comprises a client stub processing unit which executes stub processing of a first message which contains version information indicating a program version. Each of the plurality of server apparatuses comprises a server skeleton processing unit which executes skeleton processing of the first message containing version information indicating a program version, a distributed-object storing repository which stores one or more distributed objects, a pre-transfer information management table which holds information on the one or more distributed objects stored in the distributed-object storing repository, a memory which is allocated to an activated process, and temporarily stores at least one distributed object transferred from the distributed-object storing repository, a post-transfer information management table which holds information on the at least one distributed object stored in the memory, a distributed object execution control unit which dynamically links one of the one or more distributed objects corresponding to the version information contained in the first message of which skeleton processing is executed by the server skeleton processing unit, to the memory, so as to enable execution of at least one function in the one of the one or more distributed objects, and a server stub processing unit which executes stub processing of a second message containing the version information so as to transmit the second message to another of the plurality of server apparatuses.

As described above, in the distributed processing system according to the fourth aspect of the present invention, a message containing information on a program version is transmitted to from a client apparatus to a server apparatus, and a program component corresponding to the information on the program version is dynamically linked to an activated process in the server apparatus so that the program can be executed. Therefore, a new version of software can be loaded into the server apparatus during execution of another version of software for transaction processing. That is, software can be dynamically and efficiently loaded into the server apparatus, or software loaded in the server apparatus can be dynamically and efficiently replaced, without stopping transaction.

The distributed processing system according to the fourth aspect of the present invention may have one or any possible combination of the following additional features (viii) to (xiv).

(viii) The post-transfer information management table may indicate for each of the at least one distributed object a reference count which indicates the number of executions in which the each of the at least one distributed object are currently referred to.

(ix) When the distributed processing system according to the fourth aspect of the present invention has the above feature (viii), the distributed object execution control unit may remove one of the at least one distributed object from the memory when the reference count for the one of the at least one distributed object is zero, and information on a newer version of the one of the at least one distributed object is included in the post-transfer information management table.

(x) Each of the first and second messages may further contain an evaluation flag which indicates whether or not a distributed object is under evaluation.

(xi) When the distributed processing system according to the fourth aspect of the present invention has the above feature (x), the distributed object execution control unit may execute the distributed object for which the evaluation flag is contained in the first message, in a separate process, when the evaluation flag indicates that the program component for which the evaluation flag is contained in the first message is under evaluation.

(xii) The post-transfer information management table may indicate for each of the at least one distributed object an evaluation count which indicates the number of evaluations which are currently performed on the each of the at least one distributed object.

(xiii) When the distributed processing system according to the fourth aspect of the present invention has the above feature (xii), the distributed object execution control unit may terminate execution of one of the at least one distributed object in a separate process when the evaluation count corresponding to the one of the at least one distributed object is zero.

(xiv) The distributed processing system according to the fourth aspect of the present invention may further comprise a management server which sets and manages the one or more distributed objects stored in the distributed-object storing repository and the information on the one or more distributed objects held in the pre-transfer information management table.

(5) According to the fifth aspect of the present invention, there is provided a client apparatus comprising: an interface unit which controls operations of inputting and outputting software; and a client stub processing unit which executes stub processing of a message which contains version information indicating a program version.

The above message may further contain an evaluation flag which indicates whether or not a distributed object is under evaluation.

(6) According to the sixth aspect of the present invention, there is provided a server apparatus comprising: a server skeleton processing unit which executes skeleton processing of a first message containing version information indicating a program version; a distributed-object storing repository which stores one or more distributed objects; a pre-transfer information management table which holds information on the one or more distributed objects stored in the distributed-object storing repository; a memory which is allocated to an activated process, and temporarily stores at least one distributed object transferred from the distributed-object storing repository; a post-transfer information management table which holds information on the at least one distributed object stored in the memory; a distributed object execution control unit which dynamically links one of the one or more distributed objects corresponding to the version information contained in the first message of which skeleton processing is executed by the server skeleton processing unit, to the memory, so as to enable execution of at least one function in the one of the one or more distributed objects; and a server stub processing unit which executes stub processing of a second message containing the version information so as to transmit the second message to another server apparatus.

The client apparatus according to the fifth aspect of the present invention and the server apparatus according to the sixth aspect of the present invention are constituents of the distributed processing system according to the fourth aspect of the present invention.

The server apparatus according to the sixth aspect of the present invention may have one or any possible combination of the aforementioned additional features (viii) to (xiv).

(7) According to the seventh aspect of the present invention, there is provided a method for updating a program component loaded in a server in an N-tier client-server environment, comprising the steps of: (a) storing in the server one or more program components; (b) holding information on the one or more program components stored in the server, in a pre-transfer information management table; (c) transmitting a first message containing version information indicating a program version, from a client to the server; (d) receiving the first message by the server; (e) dynamically linking one of the one or more program components corresponding to the version information contained in the first message, to a memory which is allocated to an activated process in the server, so as to enable execution of the one of the one or more program components in the process; (f) holding in a post-transfer information management table information on at least one program component stored in the memory; and (g) transmitting to another server a second message containing the version information.

As described above, in the method according to the seventh aspect of the present invention, a message containing information on a program version is transmitted from a client to a server, and a program component corresponding to the information on the version of the program is dynamically linked to a process, and executed. Therefore, a new version of software can be loaded during execution of another version of software for transaction processing. Therefore, a new version of software can be loaded into the server during execution of another version of software for transaction processing. That is, software can be dynamically and efficiently loaded into the server, or software loaded in the server can be dynamically and efficiently replaced, without stopping transaction.

The method according to the seventh aspect of the present invention may have one or any possible combination of the following additional features (xv) to (xxi).

(xv) The post-transfer information management table may indicate for each of the at least one program component a reference count which indicates the number of executions in which the each of the at least one program component are currently referred to.

(xvi) When the method according to the seventh aspect of the present invention has the above feature (xv), the method may further comprise the step of (h) removing one of the at least one program component from the memory when the reference count for the one of the at least one program component is zero, and information on a newer version of the one of the at least one program component is included in the post-transfer information management table.

(xvii) Each of the first and second messages may further contain an evaluation flag which indicates whether or not a program component is under evaluation.

(xviii) When the method according to the seventh aspect of the present invention has the above feature (xvii), in the step (f), the program component for which the evaluation flag is contained in the first message may be executed in a separate process when the evaluation flag indicates that the program component for which the evaluation flag is contained in the first message is under evaluation.

(xix) The post-transfer information management table may indicate for each of the at least one program component an evaluation count which indicates the number of evaluations which are currently performed on the each of the at least one program component.

(xx) When the method according to the seventh aspect of the present invention has the above feature (xix), the method may further comprise the step of (i) terminating execution of one of the at least one program component in a separate process when the evaluation count corresponding to the one of the at least one program component is zero.

(xxi) The method according to the seventh aspect of the present invention may further comprise the step of (j) setting and managing the one or more program components stored in the server and the information on the one or more program components held in the pre-transfer information management table, by using a management apparatus.

(8) According to the eighth aspect of the present invention, there is provided a product for use with a program execution apparatus. When the product is used with the program execution apparatus, the product is able to output control information which directs the program execution apparatus to comprise: a message receiving unit which receives a message containing version information indicating a program version; a program storing unit which stores one or more program components; a pre-transfer information management table which holds information on the one or more program components stored in the program storing unit; a program memory unit which is allocated to an activated process, and temporarily stores at least one program component transferred from the program storing unit; a post-transfer information management table which holds information on the at least one program component stored in the program memory unit; and a program executing unit which dynamically links one of the one or more program components corresponding to the version information contained in the message received by the message receiving unit, to the program memory unit, so as to enable execution of the one of the one or more program components.

The product according to the eighth aspect of the present invention may have one or any possible combination of the aforementioned additional features (i) to (vii).

(9) According to the ninth aspect of the present invention, there is provided a product for use with a server apparatus. When the product is used with the server apparatus, the product is able to output control information which directs the server apparatus to comprise: a server skeleton processing unit which executes skeleton processing of a first message containing version information indicating a program version; a distributed-object storing repository which stores one or more distributed objects; a pre-transfer information management table which holds information on the one or more distributed objects stored in the distributed-object storing repository; a memory which is allocated to an activated process, and temporarily stores at least one distributed object transferred from the distributed-object storing repository; a post-transfer information management table which holds information on the at least one distributed object stored in the memory; a distributed object execution control unit which dynamically links one of the one or more distributed objects corresponding to the version information contained in the first message of which skeleton processing is executed by the server skeleton processing unit, to the memory, so as to enable execution of at least one function in the one of the one or more distributed objects; and a server stub processing unit which stub processing of a second message containing the version information so as to transmit the second message to another server apparatus.

The product according to the ninth aspect of the present invention may have one or any possible combination of the aforementioned additional features (viii) to (xiv).

(10) According to the tenth aspect of the present invention, there is provided a product for use with a server in an N-tier client-server environment for updating a program component loaded in the server. When the product is used with the server, the product is able to output control information which directs the server to execute a method comprising the steps of: (a) storing in the server one or more program components; (b) holding information on the one or more program components stored in the server, in a pre-transfer information management table; (c) receiving a first message containing version information indicating a program version; (d) dynamically linking one of the one or more program components corresponding to the version information contained in the first message, to a memory which is allocated to an activated process in the server, so as to enable execution of the one of the one or more program components in the process; (e) holding in a post-transfer information management table information on at least one program component stored in the memory; and (f) transmitting to another server a second message containing the version information.

The product according to the tenth aspect of the present invention may have one or any possible combination of the aforementioned additional features (xv) to (xxi).

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIGS. 7(A) and 7(B) are diagrams illustrating examples of mapping from the IDL definition to the programming language C++;

FIG. 8 is a diagram illustrating an example of the component-version-information definition file T1';

FIG. 10 is a diagram illustrating an example of the component-version-information management table T2';

FIG. 15 is a diagram illustrating an example of a definition of a message in the IDL (Interface Definition Language), which includes the evaluation flag 2d as well as the version information 2b;

FIG. 16 is a diagram illustrating an example of mapping from the IDL definition to the programming language C++;

FIG. 18 is a diagram illustrating an example of a component-version-information management table T2-2;

DESCRIPTION OF THE PREFERRED EMBODIMENTS

Embodiments of the present invention are explained in detail below with reference to drawings.

(1) Functions of Program Replacement Systemes

Figure 1:
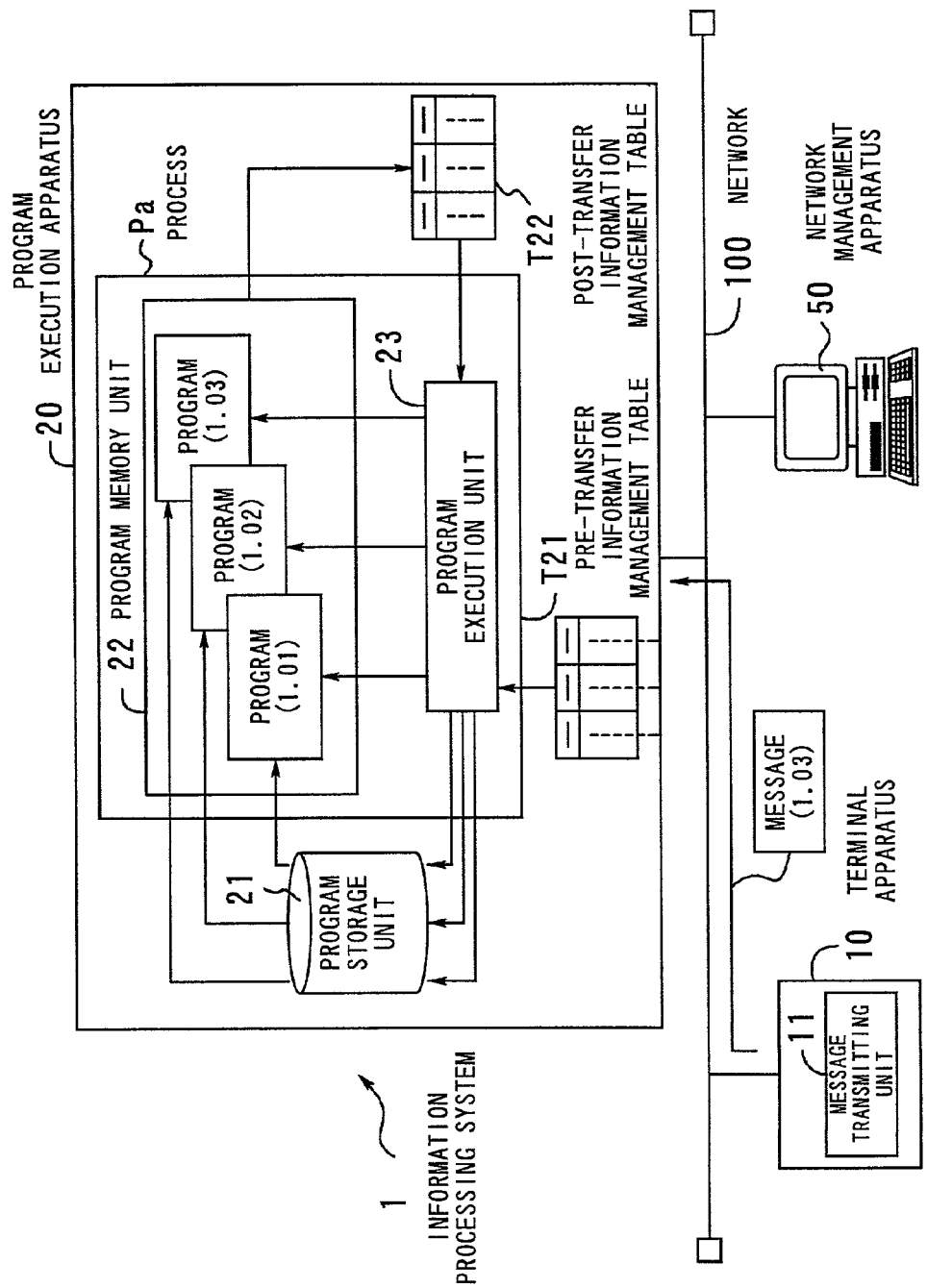
FIG. 1 is a diagram illustrating a basic construction of an information processing system 1 according to the present invention.

FIG. 1 is a diagram illustrating a basic construction of an information processing system 1 according to the present invention. The information processing system 1 comprises a terminal 10 and a program execution apparatus 20. The program execution apparatus 20 and the terminal 10 are connected through a network 100.

The message transmitting unit 11 in the terminal 10 transmits a transaction message (hereinafter called a message) including version information, which indicates a version of an application program (hereinafter called a program) with which a currently loaded version of the application program is to be replaced. In the example of FIG. 1, the message which contains version information indicating a version number "1.03" is transmitted from the terminal 10 to the program execution apparatus 20. A newer version is indicated by a greater version number. Although not shown, the terminal 10 further comprises an interface unit which controls input and output of software.

The program storage unit 21 stores at least one program for loading or replacement. The pre-transfer information management table T21 stores information on the at least one program stored in the program storage unit 21, where the information includes the version, the name, and the like of each of the at least one program. The program memory unit 22 is a memory used in a process Pa, and temporarily stores at least one program which is transferred from the program storage unit 21. In the example of FIG. 1, the program memory unit 22 stores versions "1.01" to "1.03" of a program. The post-transfer information management table T22 stores information on the at least one program stored in the program memory unit 22.

The program execution unit 23 dynamically links a version of a program corresponding to the version information contained in the message, to the program memory unit 22 which stores another version of the program currently running in the process Pa. In this specification, the dynamic linkage of a program to a memory means transfer of the program to the memory without stopping transaction processing or the like which is currently conducted by executing another program currently loaded in the memory, so that the linked program becomes executable.

For example, it is assumed that the versions "1.01" and "1.02" of the program have already been transferred from the program storage unit 21 to the program memory unit 22. In this case, when the program execution apparatus 20 receives a message which contains version information indicating the version "1.03," the program execution unit 23 accesses the pre-transfer information management table T21 and the post-transfer information management table T22 to recognize the location of the version "1.03" of the program, as explained later with reference to FIG. 2. Since, in this case, the version "1.03" of the program is not linked to the program memory unit 22, the program execution unit 23 transfers the version "1.03" of the program to the program memory unit 22. Thus, the version "1.03" of the program is linked to the process Pa, and thus the new version of the program can be executed.

As described above, according to the present invention, it is possible to dynamically incorporate a new program in a currently running process. That is, a program component can be replaced without stopping transaction processing in the currently running process.

As another example, when a user requests execution of the version "1.01" of the program during running of the version "1.03" of the program, a message which contains version information indicating the version number "1.01" is transmitted from the terminal 10 to the program execution apparatus 20. Thus, the program execution unit 23 can call the version "1.01" of the program which is stored in the program memory unit 22, into execution.

In addition, the network management apparatus 50 is connected to the network 100. The network management apparatus 50 manages and maintains apparatuses connected to the network 100. For example, the network management apparatus 50 sets and manages the programs stored in the program storage unit 21 and the information stored in the pre-transfer information management table T21.

Figure 2:
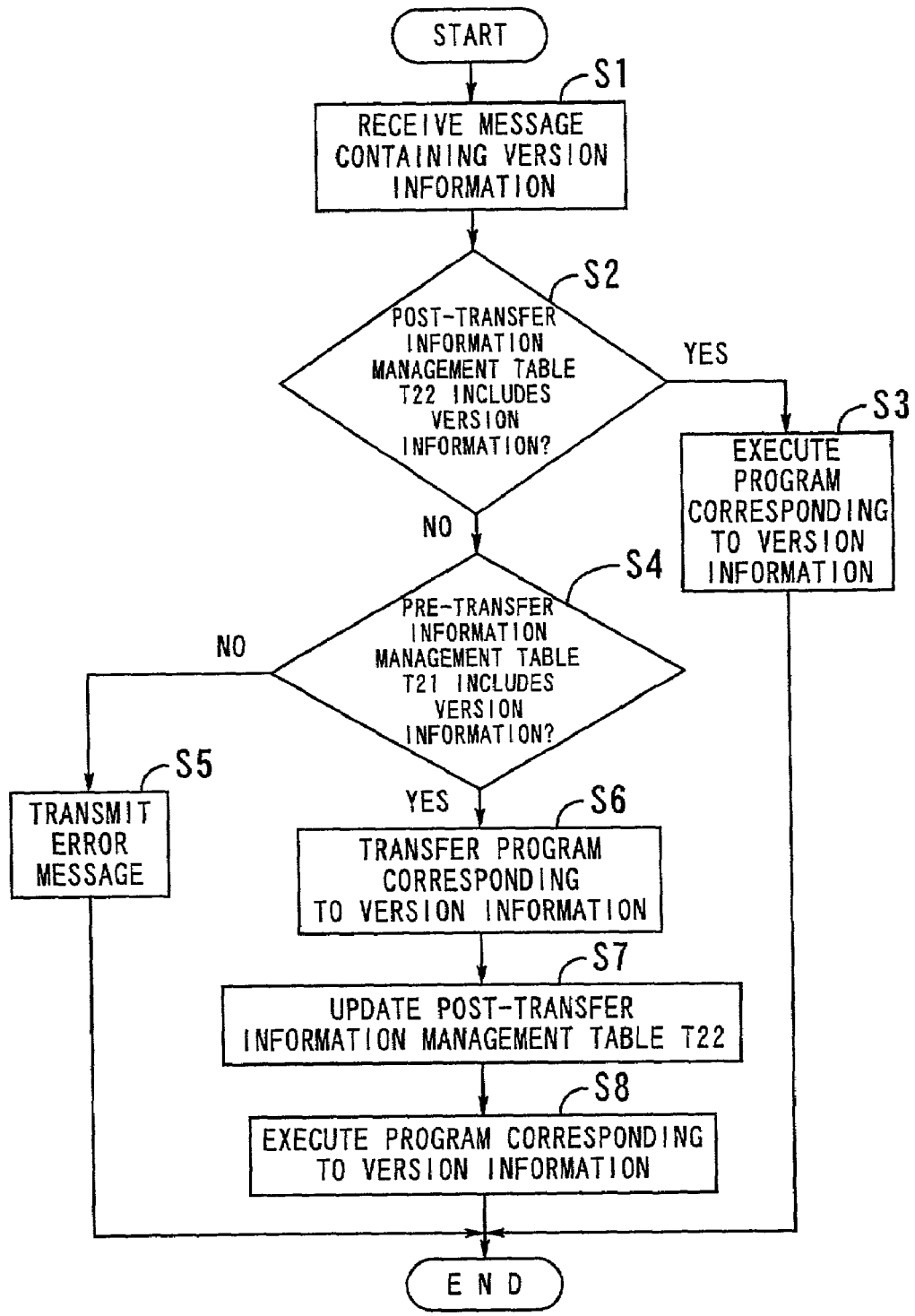
FIG. 2 is a flow diagram illustrating the operations of the information processing system 1.

The operations of the information processing system 1 are explained below with reference to FIG. 2, which is a flow diagram illustrating the operations of the information processing system 1.

In step S1, the program execution apparatus 20 receives a message containing version information A which is transmitted from the terminal 10. In step S2, the program execution unit 23 determines whether or not the post-transfer information management table T22 stores the version information A. When yes is determined in step S2, the operation goes to step S3. When no is determined in step S2, the operation goes to step S4. In step S3, the program execution unit 23 executes the program corresponding to the version information A. In step S4, the program execution unit 23 refers to the pre-transfer information management table T21, and determines whether or not the program storage unit 21 stores the version information A. When yes is determined in step S4, the operation goes to step S6. When no is determined in step S5. In step S5, the program execution apparatus 20 transmits an error message to the terminal 10. In step S6, the program execution unit 23 dynamically links the program corresponding to the version information A stored in the program storage unit 21, to the program memory unit 22. In step S7, the program execution unit 23 updates the contents of the post-transfer information management table T22. In step S8, the program execution unit 23 executes the program corresponding to the version information A.

(2) First Embodiment

Figure 3:
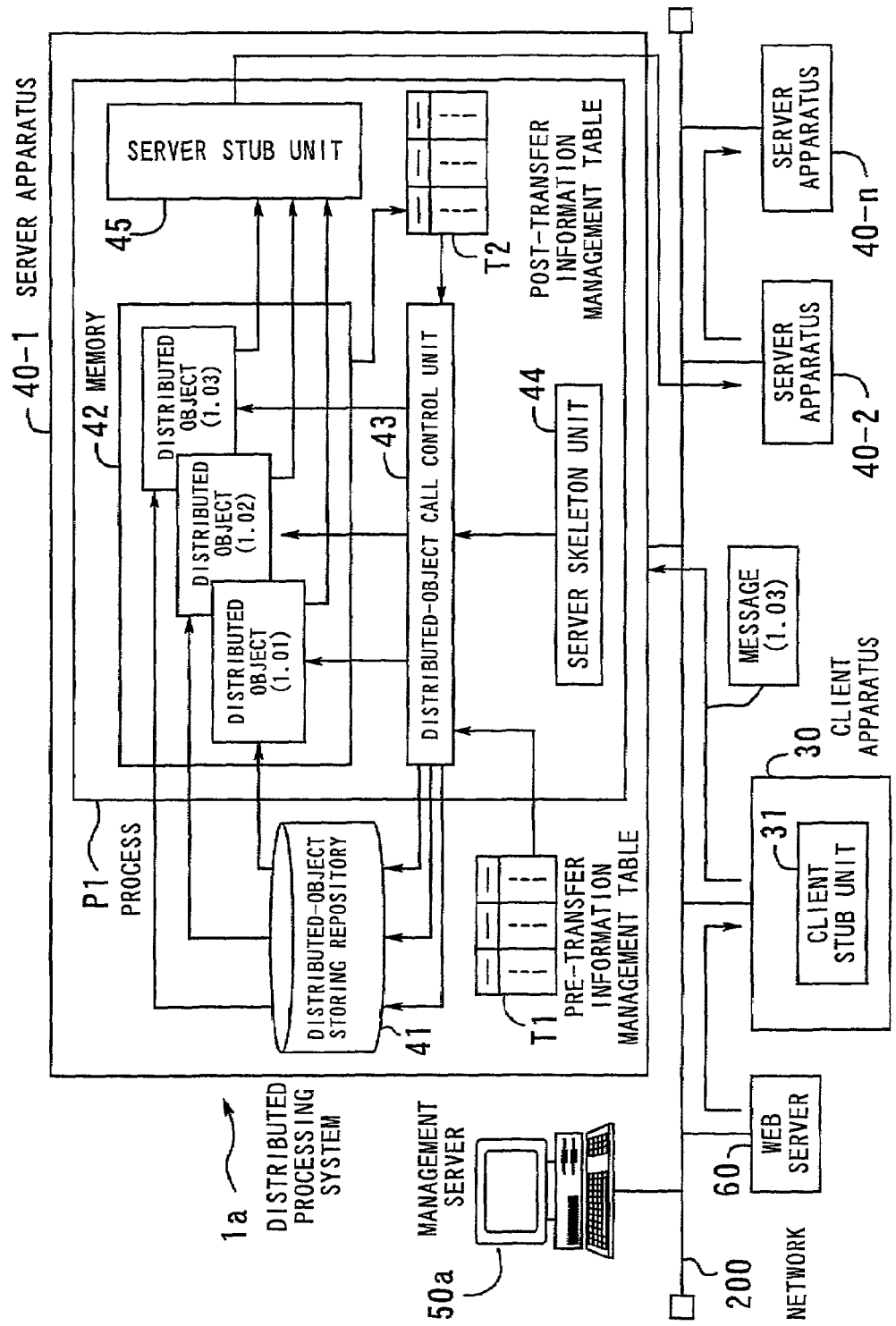
FIG. 3 is a diagram illustrating the construction of the information processing system as the first embodiment of the present invention.

FIG. 3 is a diagram illustrating the construction of the information processing system as the first embodiment of the present invention. In the first embodiment, the present invention is applied to a distributed processing system realizing an N-tier client-server environment. That is, the distributed processing system 1a of FIG. 3 comprises a client apparatus 30 and a plurality of server apparatuses 40-1 to 40-n which are arranged on a network 200 so as to form an N-tier client-server architecture in which basically distributed object computing is performed. In addition, a distributed object communication infrastructure called the Object Request Broker (ORB) is provided on the network 200. The Object Request Broker (ORB) in the construction of FIG. 3 is the Common Object Request Broker Architecture (CORBA), DCOM (Distributed Component Object Model (CORBA), or the like. In the following explanations, it is assumed that the ORB is CORBA.

In the construction of FIG. 3, first, a client application is downloaded from the Web server 60 to the client apparatus 30, where the Web server 60 is connected to the network 200. Thereafter, distributed objects are delivered through the ORB to the client apparatus 30 and the plurality of server apparatuses 40-1 to 40-n, and loading or replacement of distributed objects is performed through the ORB, where the distributed objects are each a program unit such as an application program, a library, or the like.

The client stub unit 31 in the client apparatus 30 executes stub processing of a message which contains version information indicating a version of at least one distributed object, where the stub processing is processing performed in a client apparatus for transmitting a message or a distributed object from the client apparatus to a server apparatus through the ORB.

In addition, the client apparatus 30 comprises an interface unit (not shown) for controlling operations of inputting and outputting software.

In each of the plurality of server apparatuses 40-1 to 40-n, the server skeleton unit 44 executes skeleton processing of the message transmitted from the client apparatus 30, where the skeleton processing is processing performed in a server apparatus for receiving a message or a distributed object transmitted from a client apparatus through the ORB. The distributed-object storing repository 41 stores at least one distributed object for loading or replacement, and the pre-transfer information management table T1 stores information on the at least one distributed object stored in the distributed-object storing repository 41. Details of the information stored in the pre-transfer information management table T1 are explained later with reference to FIG. 8. The memory 42 is a memory which is allocated to a process P1, and temporarily stores at least one distributed object transferred from the distributed-object storing repository 41. The post-transfer information management table T2 stores information on the at least one distributed object stored in the memory 42. Details of the information stored in the post-transfer information management table T2 are explained later with reference to FIG. 10. The distributed-object call control unit 43 dynamically links a distributed object corresponding to the version information contained in the received message, to the memory 42 allocated to the process P1 in which another version of the distributed object or another distributed object is currently executed. Then, the distributed-object call control unit 43 calls a function in the linked distributed object into execution. The server stub unit 45 executes stub processing of a message containing version information when a first one of the plurality of server apparatuses 40-1 to 40-n to which the server stub unit 45 belongs sends a request to a second one of the plurality of server apparatuses 40-1 to 40-n. For example, the request is sent for changing a version of a distributed object in the second one of the plurality of server apparatuses 40-1 to 40-n, or calling a distributed object loaded in the second one of the plurality of server apparatuses 40-1 to 40-n. That is, in this case, the first server apparatus acts a client.

In addition, the management server 50a is connected to the network 200. The management server 50a manages and maintains the apparatuses connected to the network 200. For example, the network management apparatus 50a sets and manages the distributed objects stored in the distributed-object storing repository 41 and the information stored in the pre-transfer information management table T1.

For example, when versions "1.01" and "1.02" of a distributed object are stored in the memory 42, and the server apparatus 40-1 receives a message which contains version information indicating the version "1.03," the distributed-object call control unit 43 accesses the pre-transfer information management table T1 and the post-transfer information management table T2 to recognize the location of the version "1.03" of the distributed object, as explained later with reference to FIG. 11. Thus, the version "1.03" of the distributed object is linked to the process P1, and the new version of the distributed object can be executed. Next, the server stub unit 45 in the server apparatus 40-1 produces a message containing the version information "1.03," and sends the message to the server apparatus 40-2 so that the version "1.03" of the distributed object is also loaded into the server apparatus 40-2. Then, the server apparatus 40-2 also sends a message containing the version information "1.03" to the next server apparatus 40-3. By repeating a similar operation, the version "1.03" of the distributed object can be loaded into all of the server apparatuses 40-1 to 40-n connected to the network 200.

As described above, according to the present invention, it is possible to dynamically replace an old version of a distributed object in each of a plurality of server apparatuses with a new version of the distributed object, during transaction processing which is currently conducted by executing a program currently loaded in the memory. In addition, during loading or replacement of a version of distributed objects in server apparatuses, synchronization between the plurality of server apparatuses is maintained. After the loading or replacement, the transaction processing can be performed by execution of the program including the loaded or replaced distributed object. That is, distributed objects in all of the server apparatuses connected to the network can be loaded or replaced automatically and efficiently without stopping transaction processing realized by the currently running program. Thus, reliability and quality of the system can be increased.

Figure 4:
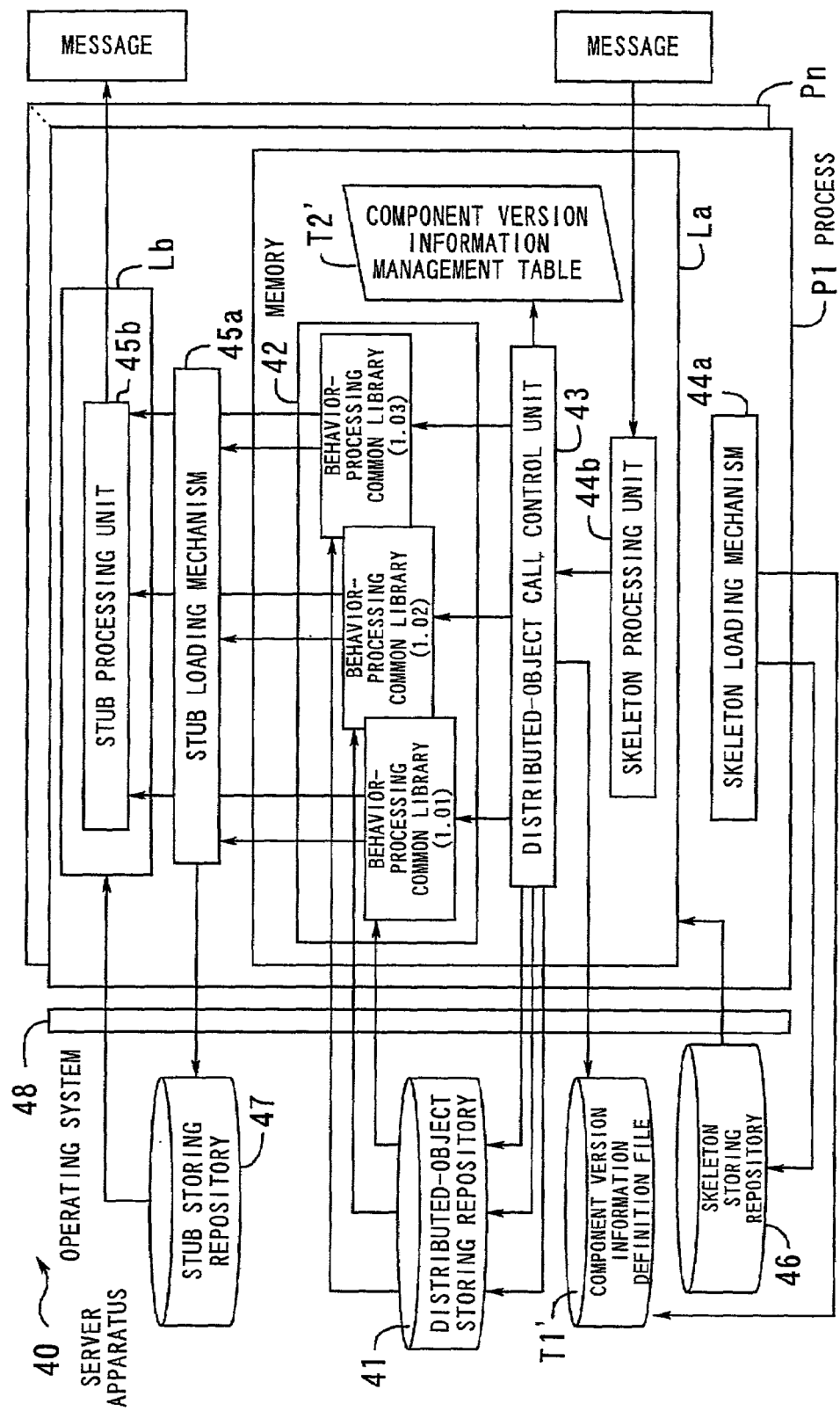
FIG. 4 is a diagram illustrating the details of the construction of each of the server apparatuses 40-1 to 40-n.

Details of the construction of each of the server apparatuses 40-1 to 40-n are explained below with reference to FIG. 4. In FIG. 4, the server apparatus 40 corresponds to each of the server apparatuses 40-1 to 40-n. In FIG. 4, the skeleton loading mechanism 44a and the skeleton processing unit 44b realize the server skeleton unit 44 in FIG. 3, and the stub loading mechanism 45a and the stub processing unit 45b realize the server stub unit 45 in FIG. 3. In addition, the component-version-information definition file T1' in FIG. 4 corresponds to the pre-transfer information management table T1 in FIG. 3, and the component-version-information management table T2' in FIG. 4 corresponds to the post-transfer information management table T2 in FIG. 3.

The skeleton storing repository 46 stores a common library for skeleton processing, which is hereinafter called a skeleton-processing common library. The skeleton loading mechanism 44*a* accesses the component-version-information definition file T1', and recognizes a name of a process stored in the component-version-information definition file T1'. Then, the skeleton loading mechanism 44*a* calls a skeleton-processing common library La corresponding to the recognized name of the process, which is stored in the skeleton storing repository 46. Thereafter, the skeleton processing unit 44*b*, which is included in the skeleton-processing common library La, performs processing for receiving a message. The distributed-object storing repository 41 stores as at least one distributed object at least one common library for behavior processing (i.e., at least one common library each containing functions). Hereinafter, each common library for behavior processing is called a behavior-processing common library.

Figure 11:
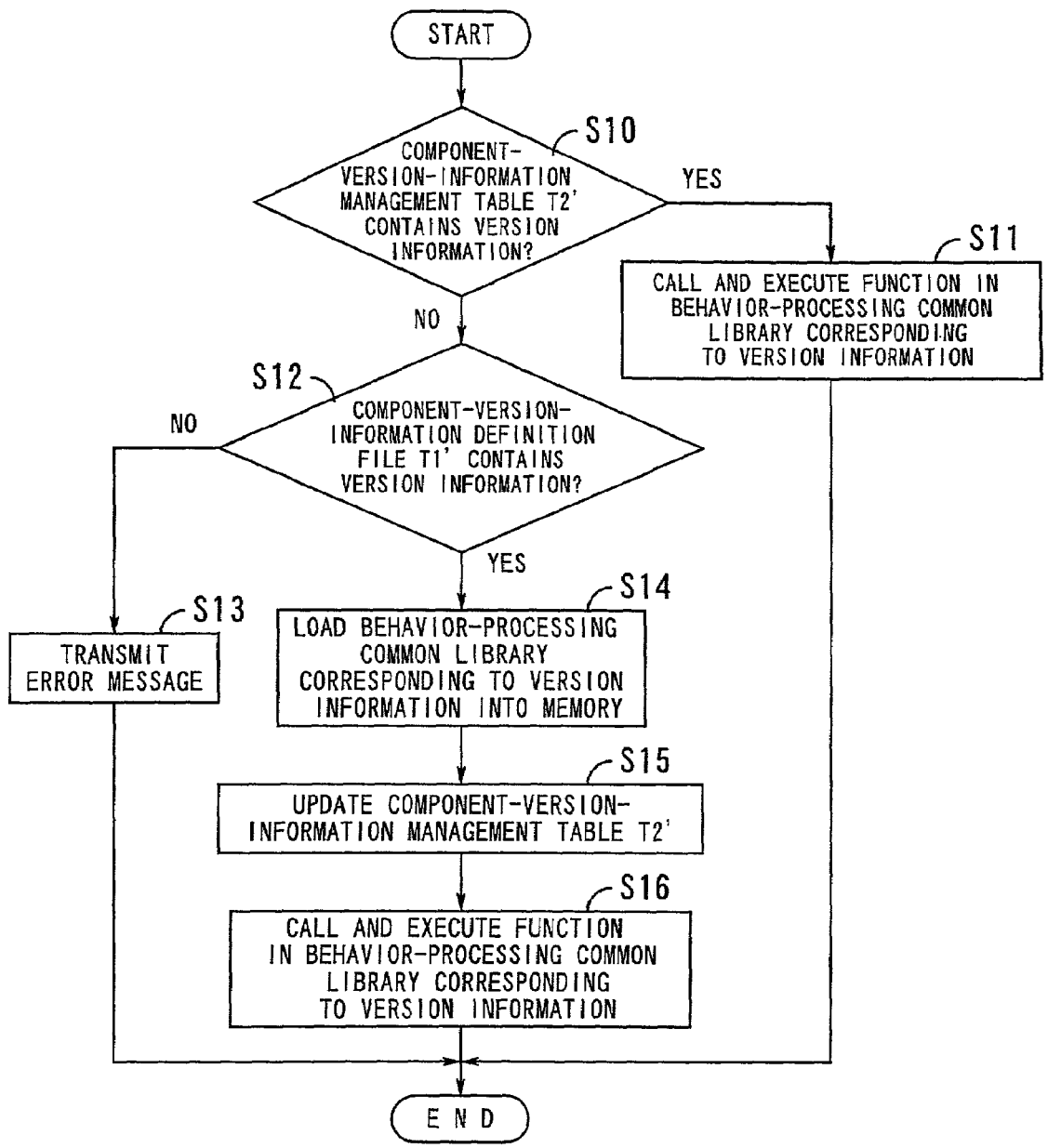
FIG. 11 is a flow diagram illustrating the operations of the distributed-object call control unit 43.

The distributed-object call control unit 43 accesses the component-version-information definition file T1' and the component-version-information management table T2' in order to recognize the location of the distributed object corresponding to version information contained in the received message (as illustrated in FIG. 11). When the distributed object is not currently linked to the memory 42, the distributed-object call control unit 43 transfers a behavior-processing common library, from the distributed-object storing repository 41 to the memory 42. Then, the distributed-object call control unit 43 calls at least one function defined in the distributed object (i.e., at least one function included in the behavior-processing common library) into execution. In addition, the distributed-object call control unit 43 holds and manages the status of the dynamic linkage and a pointer to each function in the distributed object.

The stub storing repository 47 stores at least one common library for server stub processing, which is hereinafter called a server-stub-processing common library. When a message is sent from the server apparatus (first server apparatus) to which the stub storing repository 47 belongs, to another server apparatus (second server apparatus), e.g., for invoking a distributed object in the second server apparatus, the stub loading mechanism 45*a* in the first server apparatus calls a server-stub-processing common library Lb, which is stored in the stub storing repository 47. Then, the stub processing unit 45*b*, which is included in the server-stub-processing common library Lb, performs processing for transmitting a message to the second server apparatus.

Specifically, when a request for processing by a server application in the second server apparatus arises during behavior processing (i.e., execution of a function) of a distributed object in the first server apparatus, the stub loading mechanism 45*a* is triggered in the first server apparatus. Then, in order to enable communication with the server application in the second server apparatus, an appropriate server-stub-processing common library Lb is acquired from the stub storing repository 47 in the first server apparatus, and dynamically linked to a memory. Then, the stub processing unit 45*b* in the first server apparatus executes processing for establishing a connection with the server application in the second server apparatus. At this time, the behavior processing of the distributed object is suspended until the above connection is established. When the connection is established, the distributed object packs the version information in a message, and sends the message to the second server apparatus. By repeating the above operations, it is possible to change the versions of distributed objects in a plurality of server apparatuses 40-1 to 40-n, or deliver distributed objects to the plurality of server apparatuses 40-1 to 40-n, so as to maintain synchronization between the distributed objects or the versions of the distributed objects in the plurality of server apparatuses.

Generally, a plurality of processes P1 to Pn can be generated. Each of the plurality of processes P1 to Pn can communicate with each of the skeleton storing repository 46, the stub storing repository 47, the distributed-object storing repository 41, and the component-version-information definition file T1' through the operating system 48.

The common libraries are delivered to the skeleton storing repository 46, the stub storing repository 47, and the distributed-object storing repository 41 by the management server 50*a*, and the skeleton storing repository 46, the stub storing repository 47, and the distributed-object storing repository 41 are centrally controlled by the management server 50*a*.

Figure 5:
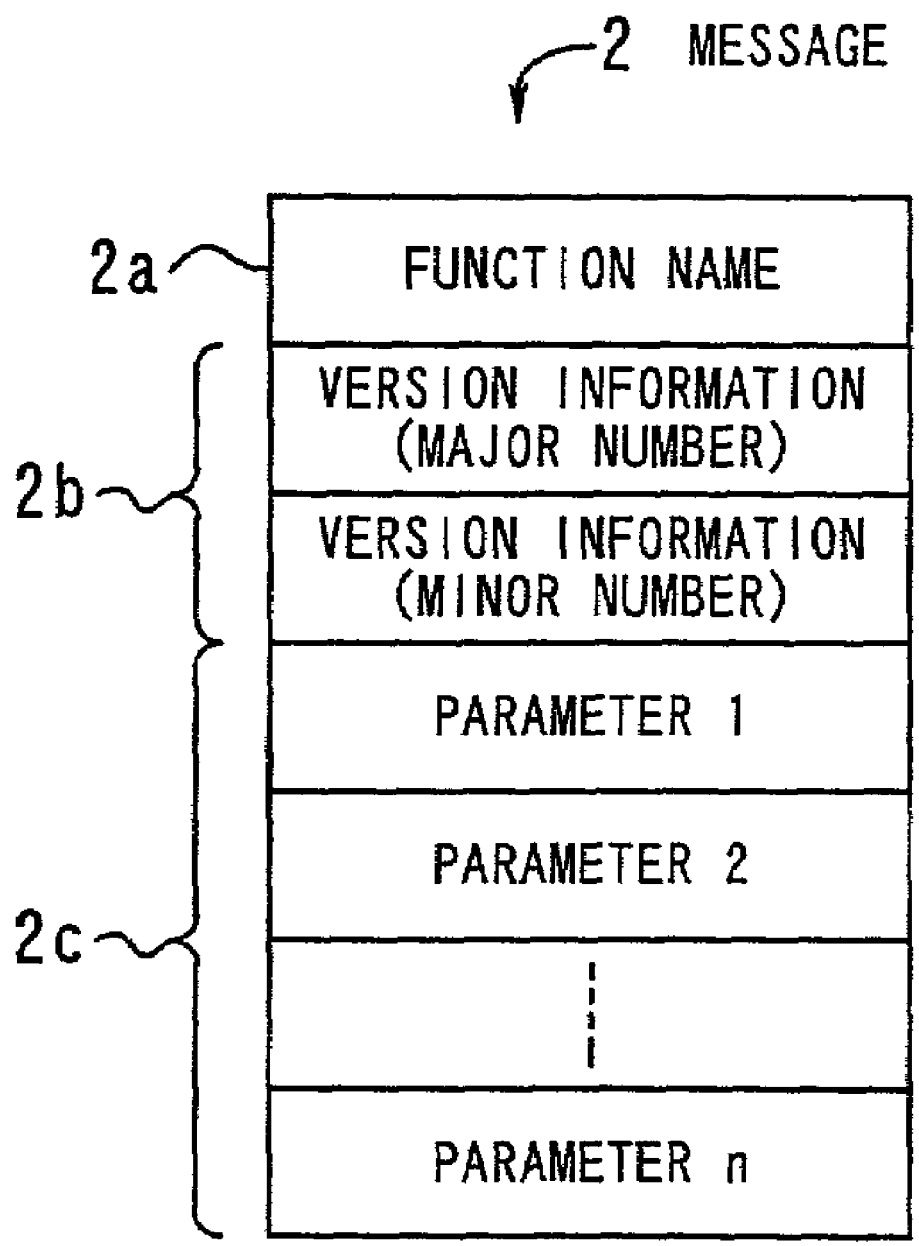
FIG. 5 is a diagram illustrating an example of a format of the message.

FIG. 5 is a diagram illustrating an example of a format of the message. The format 2 in FIG. 5 is comprised of a function name 2*a* of a distributed object, version information 2*b*, and parameters 2*c*. In this example, the version information 2*b* is a version number of the entire system, and is comprised of a major number and a minor number.

Figure 6:
FIG. 6 is a diagram illustrating an example of a definition of a message in the IDL (Interface Definition Language)

FIG. 6 is a diagram illustrating an example of a definition of a message in the IDL (Interface Definition Language), which is a language used for defining interfaces of distributed objects. As illustrated in FIG. 6, in all interfaces, version information is defined as "in" parameters, and the other parameters follow the version information.

FIGS. 7(A) and 7(B) are diagrams illustrating examples of mapping from the IDL definition to the programming language C++, where FIG. 7(A) corresponds to the version "1.01," and FIG. 7(B) corresponds to the version "1.02". As illustrated in FIGS. 7(A) and 7(B), according to the present invention, the class XXX corresponding to the version "1.01" and the class XXX corresponding to the version "1.02" are defined in different namespaces "XXX 1_01" and "XXX 1_02," respectively, when written in the programming language C++. Thus, the names of functions and variables in different versions of distributed objects do not clash, and therefore more than one version of the behavior-processing common library can be dynamically linked to a memory allocated to a process.

FIG. 8 is a diagram illustrating an example of the component-version-information definition file T1'. The component-version-information definition file T1' includes version information T1*a* indicating a version of the entire system, a name T1*b* of a behavior-processing common library, version information T1*c* indicating the version of the behavior-processing common library, and a process name T1*d*.

The version information T1*a* corresponds to the version information contained in the request message sent from the client. For example, in FIG. 8, the names "libAPL-A.so" to "libAPL-X.so" of the common libraries correspond to the version information "1.01". In addition, the skeleton storing repository 46 and the stub storing repository 47 store common libraries which have the same name and different contents. For example, a common library having the name "libAPL-A.so" stored in the skeleton storing repository 46 is a skeleton-processing common library La for the process "process-1," and another common library having the same name "libAPL-A.so" stored in the stub storing repository 47 is a stub-processing common library Lb for the process "process-1".

The version information T1*c* indicates the version of each distributed object (software component). Generally, the entire system is constituted by a combination of a plurality of versions of a plurality of software components, and the relationship between the version (the version information T1c) of each software component (constituent) and the version of the entire system are indicated in the component-version-information definition file T1'. That is, the version of each software component can be definitely determined based on the version of the entire system.

The process name T1d indicates a process to which each software component is to be linked. That is, the process name T1d indicates a process in which each software component is to be executed.

Figure 9:
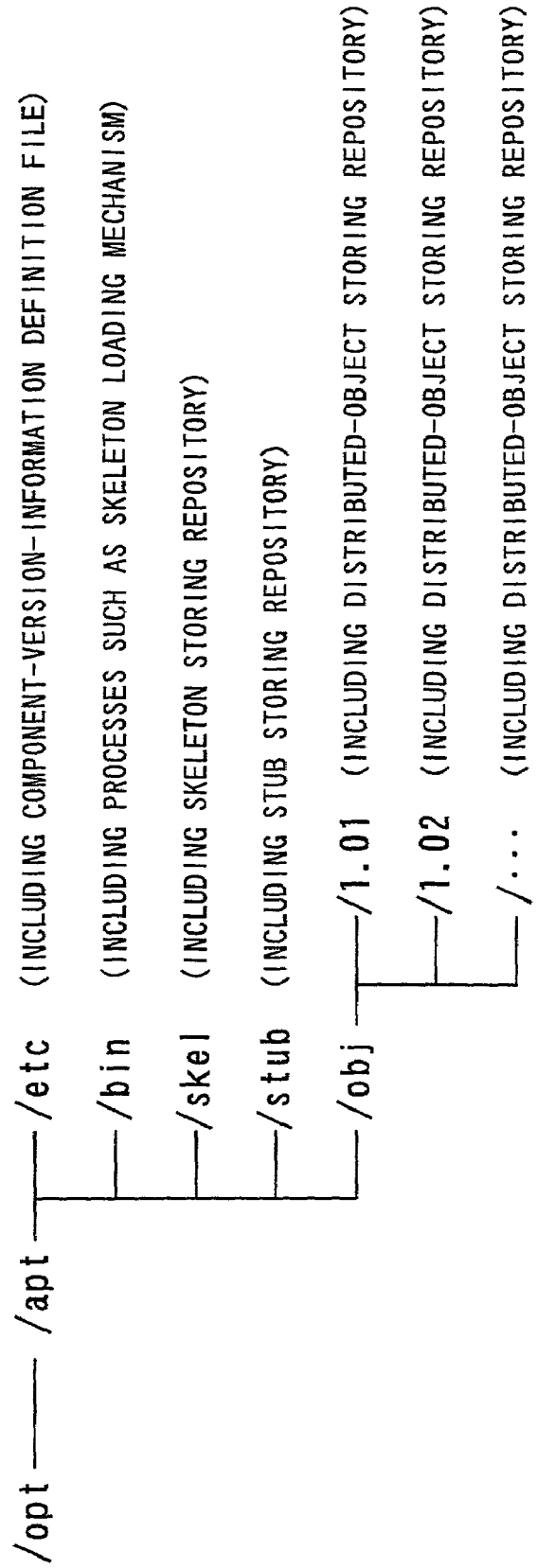
FIG. 9 is a diagram illustrating an example of a hierarchy of directories of the repositories.

FIG. 9 is a diagram illustrating an example of a hierarchy of directories of the repositories. As illustrated in FIG. 9, directories /etc, /bin, /skel, /stub, and /obj are arranged under the directories /opt and /apt. The directory /etc includes the component-version-information definition file T1', the directory /bin includes the skeleton loading mechanism 44a, the directory /skel includes the skeleton storing repository 46, and the directory /stub includes the stub storing repository 47. In addition, the directories /1.01, /1.02, and the like are arranged under the directory /obj, where the directories /1.01, /1.02, and the like include the respective versions of the distributed-object storing repositories 41.

FIG. 10 is a diagram illustrating an example of the component-version-information management table T2', which stores information on the at least one distributed object stored in the memory 42. In the example of FIG. 10, the component-version-information management table T2' indicates version information T2a indicating a version of the entire system, a name T2b of a behavior-processing common library, version information T2c indicating a version of the behavior-processing common library, a flag T2d, and an address T2e of a function table. The version information T2a, the name T2b of the behavior-processing common library, and the version information T2c are respectively similar to the version information T1a, the name T1b of the behavior-processing common library, and the version information T1c in FIG. 8. The flag T2d indicates Y when the corresponding version of the behavior-processing common library is loaded in the memory 42, and N when the corresponding version of the behavior-processing common library is not loaded in the memory 42. The address T2e indicates an address of a function table which contains addresses of functions in the corresponding version of the behavior-processing common library. For example, the address of the function table t(1.01) which contains the addresses of the functions corresponding to the version "1.01" of the behavior-processing common library is "0x00012345," and the address of the function table t(1.02) which contains the address of the function corresponding to the version "1.02" of the behavior-processing common library is "0x00023456."

The operations of the distributed-object call control unit 43 are explained below with reference to FIG. 11, which is a flow diagram illustrating the operations of the distributed-object call control unit 43.

In step S10, when the server apparatus receives a message containing version information A, the distributed-object call control unit 43 determines whether or not the component-version-information management table T2' contains the version information A. When yes is determined in step S10, the operation goes to step S11. When no is determined in step S10, the operation goes to step S12. In step S11, the distributed-object call control unit 43 calls at least one function in a behavior-processing common library corresponding to the version information A, into execution. In step S12, the distributed-object call control unit 43 refers to the component-version-information definition file T1' to determine whether or not the component-version-information definition file T1' contains the version information A. When yes is determined in step S12, the operation goes to step S14. When no is determined in step S12, the operation goes to step S13. In step S13, the server apparatus transmits an error message to the client. In step S14, the distributed-object call control unit 43 dynamically links the behavior-processing common library corresponding to the version information A and being stored in the distributed-object storing repository 41, to the memory 42. In step S15, the distributed-object call control unit 43 updates the contents of the component-version-information management table T2'. In step S16, the distributed-object call control unit 43 calls at least one function in a behavior-processing common library corresponding to the version information A, into execution.

As explained above, the distributed-object call control unit 43 is provided in each server apparatus (e.g., a server application loaded in each server apparatus), and dynamically links a behavior-processing common library corresponding to the version of the entire system which is contained in a received message, to a memory allocated to the corresponding process.

In addition, functions and variables in different versions of a behavior-processing common library are defined in different namespaces, when the program is written in the programming language C++. Therefore, the names of functions and variables in different versions of distributed objects do not clash. Thus, different versions of software can be concurrently linked to a memory allocated to the corresponding process, without stopping transaction.

Further, according to the present invention, messages containing information on the version of the entire system are transmitted between a client application and a plurality of server applications. Therefore, it is possible to change the versions of distributed objects in the plurality of server applications so as to maintain synchronization between the versions of the distributed objects in the plurality of server apparatuses even when the client and the plurality of server apparatuses form an N-tier client-server system.

(3) Second Embodiment

In the second embodiment of the present invention, an old version of a behavior-processing common library is automatically removed from a memory allocated to a process in which at least one function in the old version of the behavior-processing common library is executed, i.e., the memory is automatically released from the old version of the behavior-processing common library, when a newer version of the behavior-processing common library is loaded in the memory, and the old version of the behavior-processing common library is not used.

Figure 12:
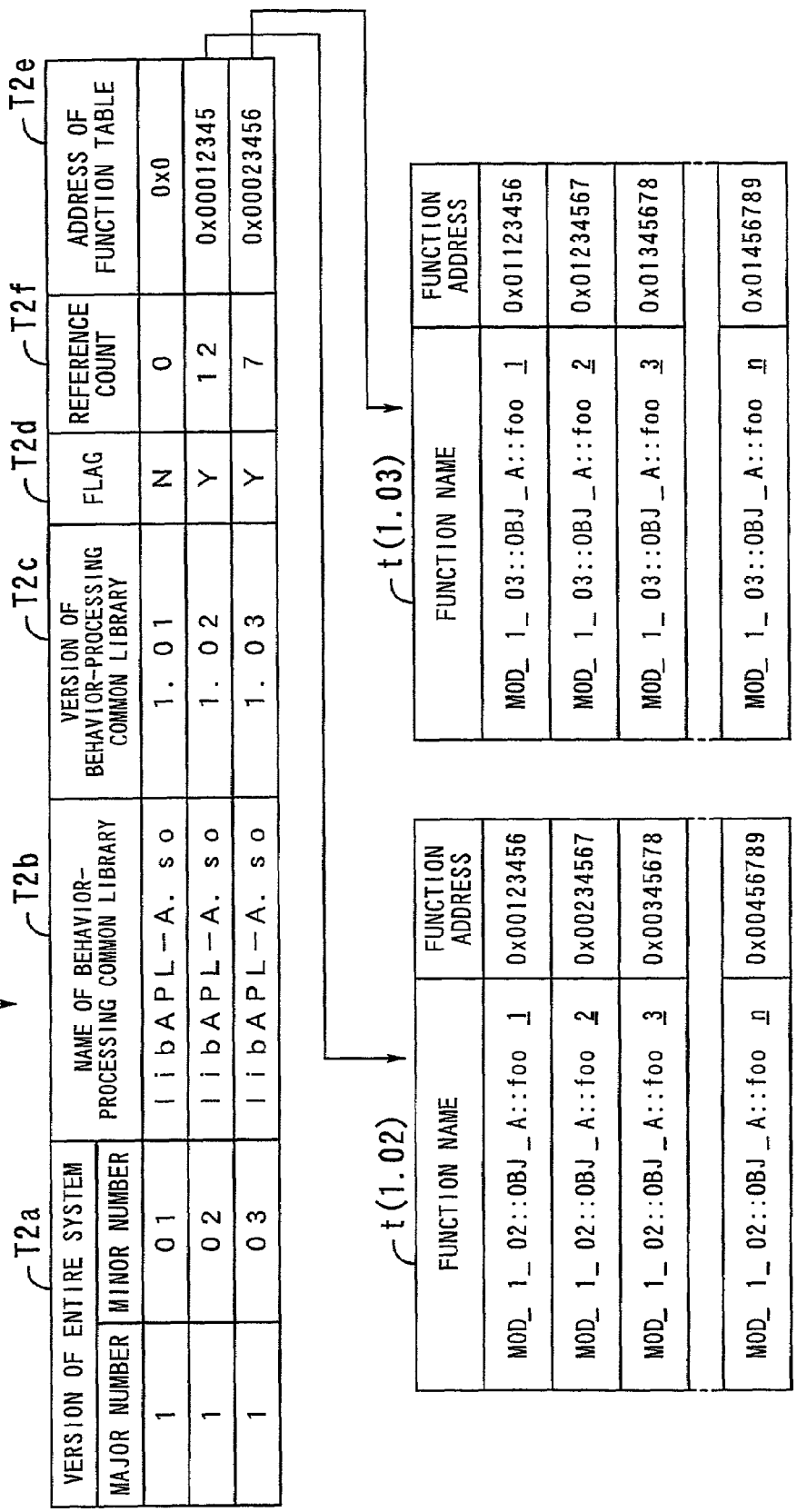
FIG. 12 is a diagram illustrating an example of a component-version-information management table T2-1.

FIG. 12 is a diagram illustrating an example of a component-version-information management table T2-1. The component-version-information management table T2-1 in the second embodiment is different from the component-version-information management table T2' in the first embodiment in that the component-version-information management table T2-1 further contains a reference count T2f for each version of each behavior-processing common library. The reference count T2f for each version of each behavior-processing common library indicates the number of current references (calls) to the behavior-processing common library corresponding to the version, i.e., the number of executions in which the version of the behavior-processing common library is currently referred to (called). When the distributed-object call control unit 43 calls a function in a version of a behavior-processing common library, the distributed-object call control unit 43 increments the reference count T2f for the version of the behavior-processing common library by one. Thereafter, when the execution of the called function is completed, i.e., when the operation returns from the execution of the called function, the distributed-object call control unit 43 decrements the reference count T2f for the above version of the behavior-processing common library by one.

Figure 13:
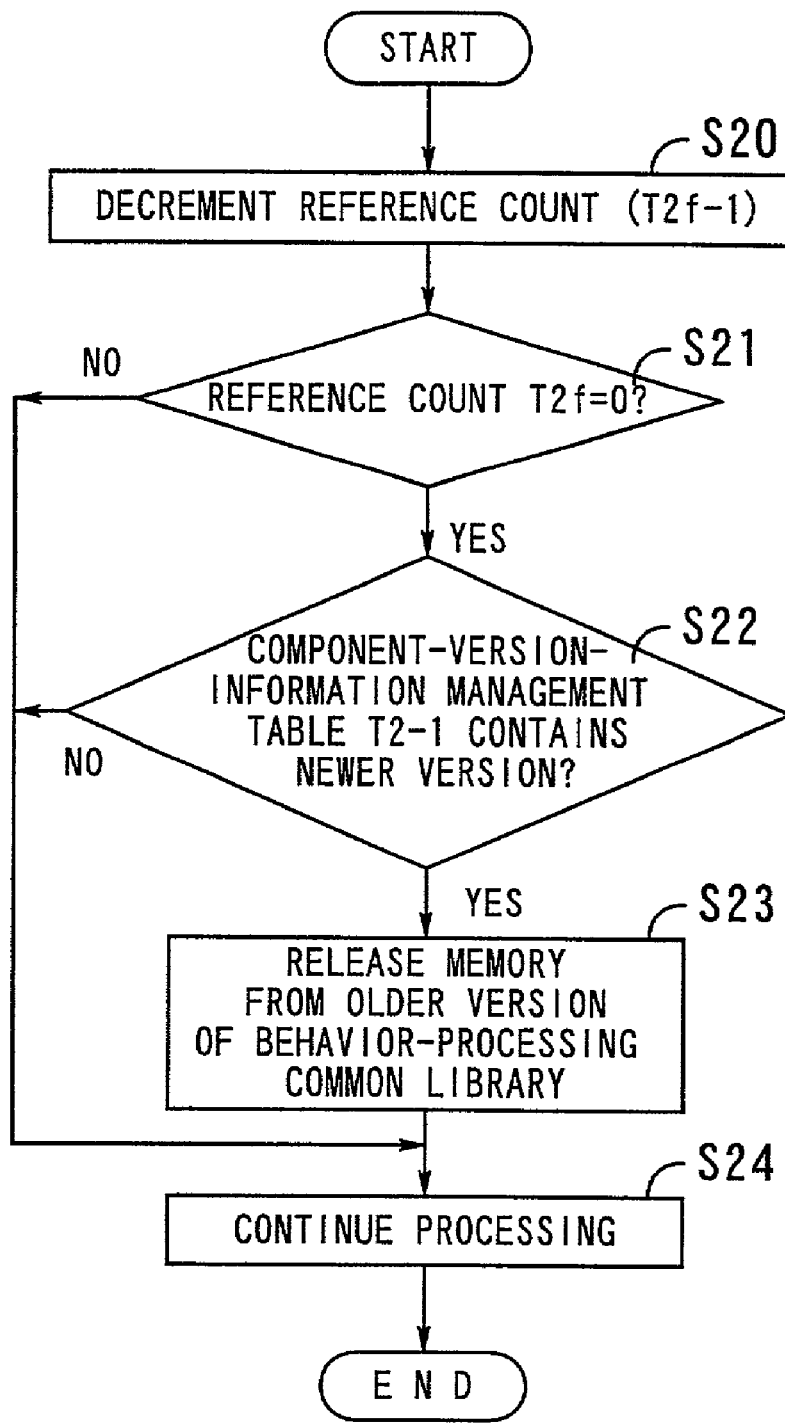
FIG. 13 is a flow diagram illustrating the operation of releasing the memory from an old version of a distributed object (i.e., a behavior-processing common library), by the distributed-object call control unit 43 in the second embodiment.

FIG. 13 is a flow diagram illustrating the operation of releasing the memory from an old version of a distributed object (i.e., a behavior-processing common library), by the distributed-object call control unit 43 in the second embodiment.

In step S20, when the distributed-object call control unit 43 completes execution of a function of a first version of the behavior-processing common library, the distributed-object call control unit 43 decrements the reference count T2f for the first version of the behavior-processing common library by one. In step S21, the distributed-object call control unit 43 determines whether or not the value of the reference count T2f for the first version of the behavior-processing common library is zero. When yes is determined in step S21, the operation goes to step S22. When no is determined in step S21, the operation goes to step S24. In step S22, the program execution unit 23 determines whether or not the component-version-information management table T2-1 contains version information indicating a newer version than the above first version. When yes is determined in step S22, the operation goes to step S23. When no is determined in step S22, the operation goes to step S24. In step S23, the distributed-object call control unit 43 removes the older (first) version of the behavior-processing common library from the memory 42, i.e., releases the memory 42 from the older (first) version of the behavior-processing common library. In step S24, the distributed-object call control unit 43 continues processing.

As explained above, in the second embodiment, the memory is automatically released from an old version of a behavior-processing common library, when a newer version of the behavior-processing common library is loaded in the memory, and the old version of the behavior-processing common library is not used. Therefore, the version of the behavior-processing common library loaded in the memory can be changed efficiently.

(4) Third Embodiment

Figure 14:
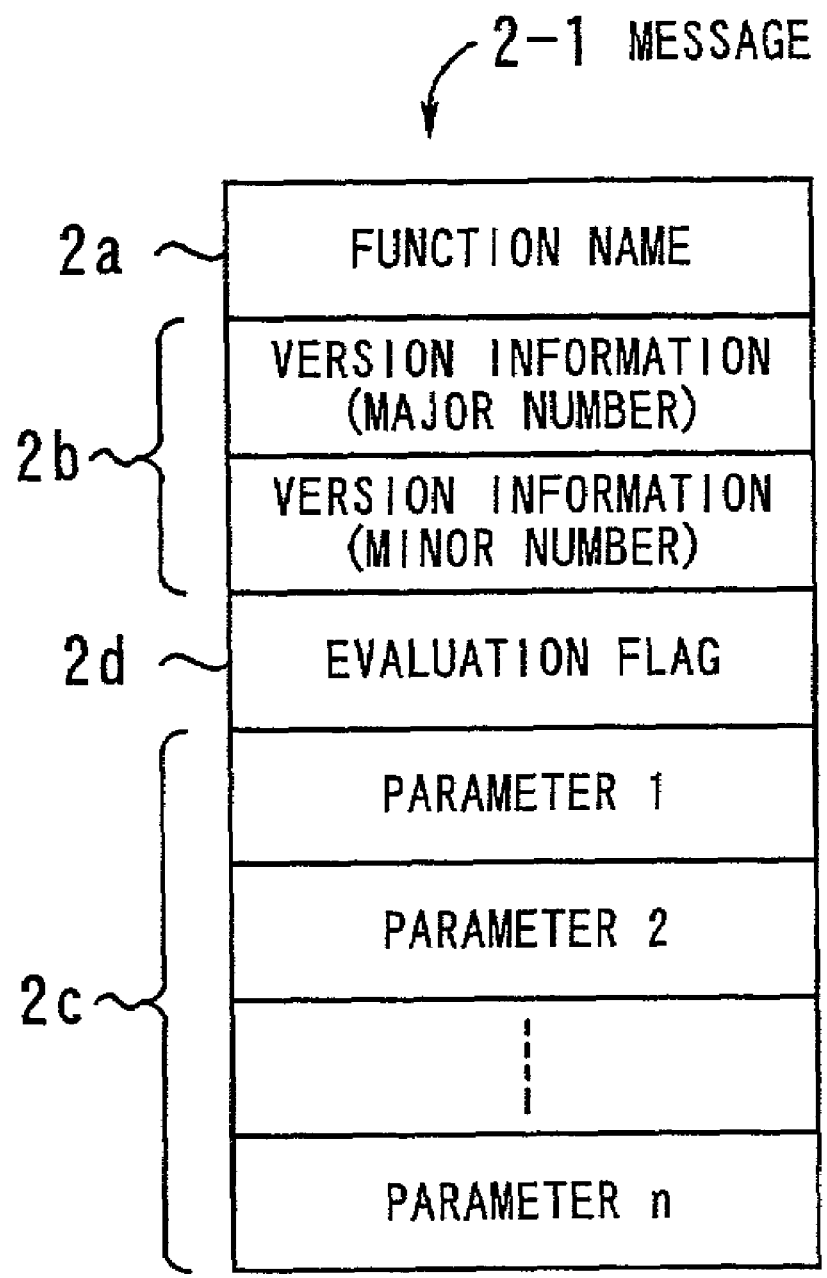
FIG. 14 is a diagram illustrating an example of a format of a message 2-1 which is transmitted between a client and a plurality of server apparatuses.

In the third embodiment of the present invention, a separate process is created for executing a distributed object under evaluation. FIG. 14 is a diagram illustrating an example of a format of a message 2-1 which is transmitted between a client apparatus and a plurality of server apparatuses. The format 2-1 of FIG. 14 is comprised of a function name 2a of a distributed object, version information 2b, parameters 2c, and an evaluation flag 2d. The version information 2b indicates a version number of the entire system, and is comprised of a major number and a minor number. The evaluation flag 2d indicates whether or not the corresponding version of the behavior-processing common library is under evaluation. FIG. 15 is a diagram illustrating an example of a definition of a message in the IDL (Interface Definition Language), which includes the evaluation flag 2d as well as the version information 2b. FIG. 16 is a diagram illustrating an example of mapping from the IDL definition to the programming language C++. As illustrated in FIG. 16, in the third embodiment, the class definition of FIG. 16 also includes the evaluation flag 2d as well as the version information 2b.

Figure 17:
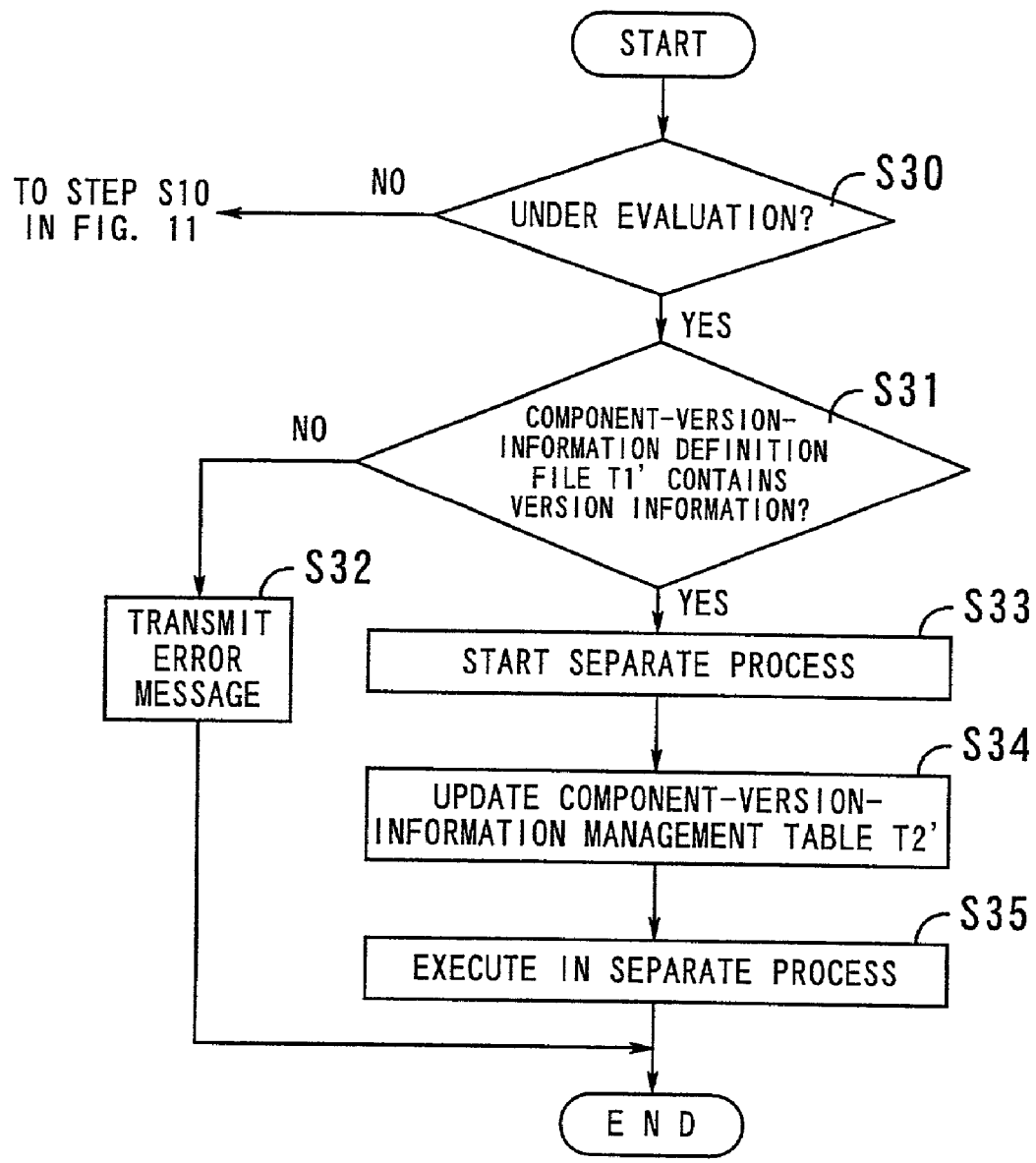
FIG. 17 is a flow diagram illustrating the operation of handling a behavior-processing common library, which is under evaluation, by the distributed-object call control unit 43 in the third embodiment.

FIG. 17 is a flow diagram illustrating the operation of handling a behavior-processing common library, which is under evaluation, by the distributed-object call control unit 43 in the third embodiment.

In step S30, the distributed-object call control unit 43 determines whether or not the evaluation flag 2d contained in a received message, which also contains version information A indicating the version of the entire system, indicates that the corresponding behavior-processing common library is under evaluation. When yes is determined in step S30, the operation goes to step S31. When no is determined in step S30, the operation goes to step S10 in FIG. 11. In step S31, the distributed-object call control unit 43 determines whether or not the component-version-information definition file T1' contains the version information A. When yes is determined in step S31, the operation goes to step S33. When no is determined in step S31, the operation goes to step S32. In step S32, the server apparatus 40 transmits an error message to the client. In step S33, the distributed-object call control unit 43 creates a separate process, and employs a skeleton loading mechanism in the separate process. Then, the distributed-object call control unit 43 loads a skeleton-processing common library Lb corresponding to the separate process and the behavior-processing common library corresponding to the version information A, into a memory allocated to the separate process. In step S34, the distributed-object call control unit 43 updates the contents of the component-version-information management table T2'. In step S35, the distributed-object call control unit 43 executes at least one function in the behavior-processing common library under evaluation in the separate process.

As explained above, in the third embodiment, a distributed object under evaluation is executed in a separate process. Therefore, execution of a function in a version of a behavior-processing common library under evaluation does not affect execution of functions in the other behavior-processing common libraries, and thus the quality of the replacement control of distributed objects can be improved.

(5) Fourth Embodiment

In the fourth embodiment of the present invention, execution, in a separate process, of a function included in a behavior-processing common library under evaluation is automatically terminated when the version of the behavior-processing common library under evaluation is loaded in the memory, and the server apparatus receives a notification of completion of the evaluation.

FIG. 18 is a diagram illustrating an example of a component-version-information management table T2-2. The component-version-information management table T2-2 in the fourth embodiment is different from the component-version-information management table T2-1 in the second embodiment in that the component-version-information management table T2-2 further contains an evaluation count T2g for each version of each behavior-processing common library. The evaluation count T2g for each version of each behavior-processing common library indicates the number of evaluations currently performed on the version of the behavior-processing common library. When the distributed-object call control unit 43 creates a separate process, and links a behavior-processing common library which is under evaluation, to a memory allocated to the separate process, the distributed-object call control unit 43 increments the evaluation count T2g by one. Thereafter, when the server apparatus receives a notification of completion of the evaluation of the behavior-processing common library, the distributed-object call control unit 43 decrements the evaluation count T2g by one.

Figure 19:
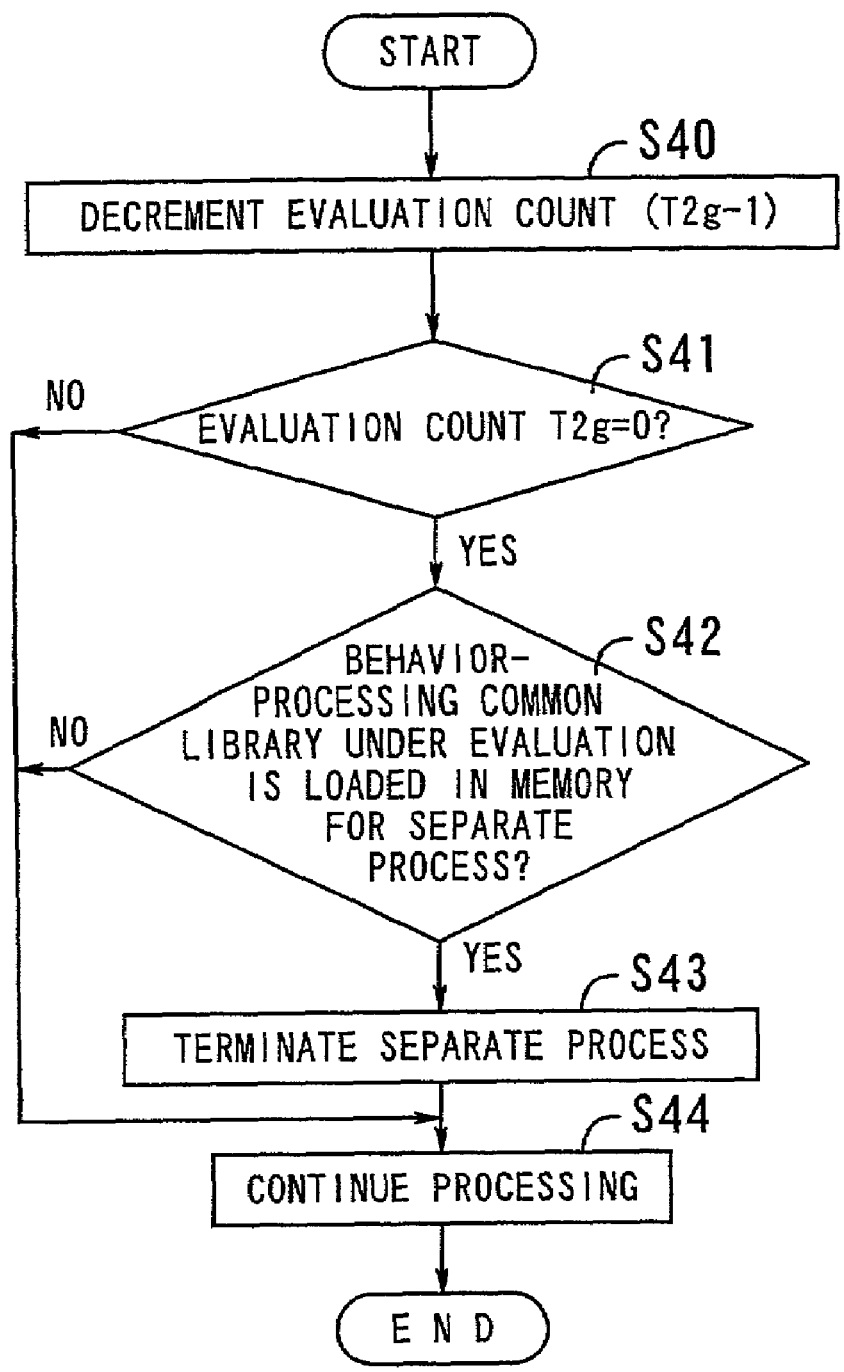
FIG. 19 is a flow diagram illustrating the operations of controlling the evaluation count T2g and execution of at least one function in a version of a behavior-processing common library under evaluation, by the distributed-object call control unit 43 in the fourth embodiment.

FIG. 19 is a flow diagram illustrating the operations of controlling the evaluation count T2g and execution of at least one function in a version of a behavior-processing common library under evaluation, by the distributed-object call control unit 43 in the fourth embodiment.

In step S40, when the distributed-object call control unit 43 receives a notification of completion of the evaluation of the above version of the behavior-processing common library, during execution of a function in the version of the behavior-processing common library, the distributed-object call control unit 43 decrements the evaluation count T2g by one. In step S41, the distributed-object call control unit 43 determines whether or not the evaluation count T2g is zero. When yes is determined in step S41, the operation goes to step S42. When no is determined in step S41, the operation goes to step S44. In step S42, the distributed-object call control unit 43 determines whether the flag T2d is Y or N, i.e., whether or not the above version of the behavior-processing common library under evaluation is dynamically linked to a memory which is allocated to a separate process created for the version of the behavior-processing common library. When yes is determined in step S42, the operation goes to step S43. When no is determined in step S42, the operation goes to step S44. In step S43, the distributed-object call control unit 43 terminates the separate process. In step S44, the distributed-object call control unit 43 continues execution.

As explained above, in the fourth embodiment, when the process for evaluation becomes unnecessary, the process for evaluation is automatically terminated.

(6) Sequence of Operations

Figure 20:
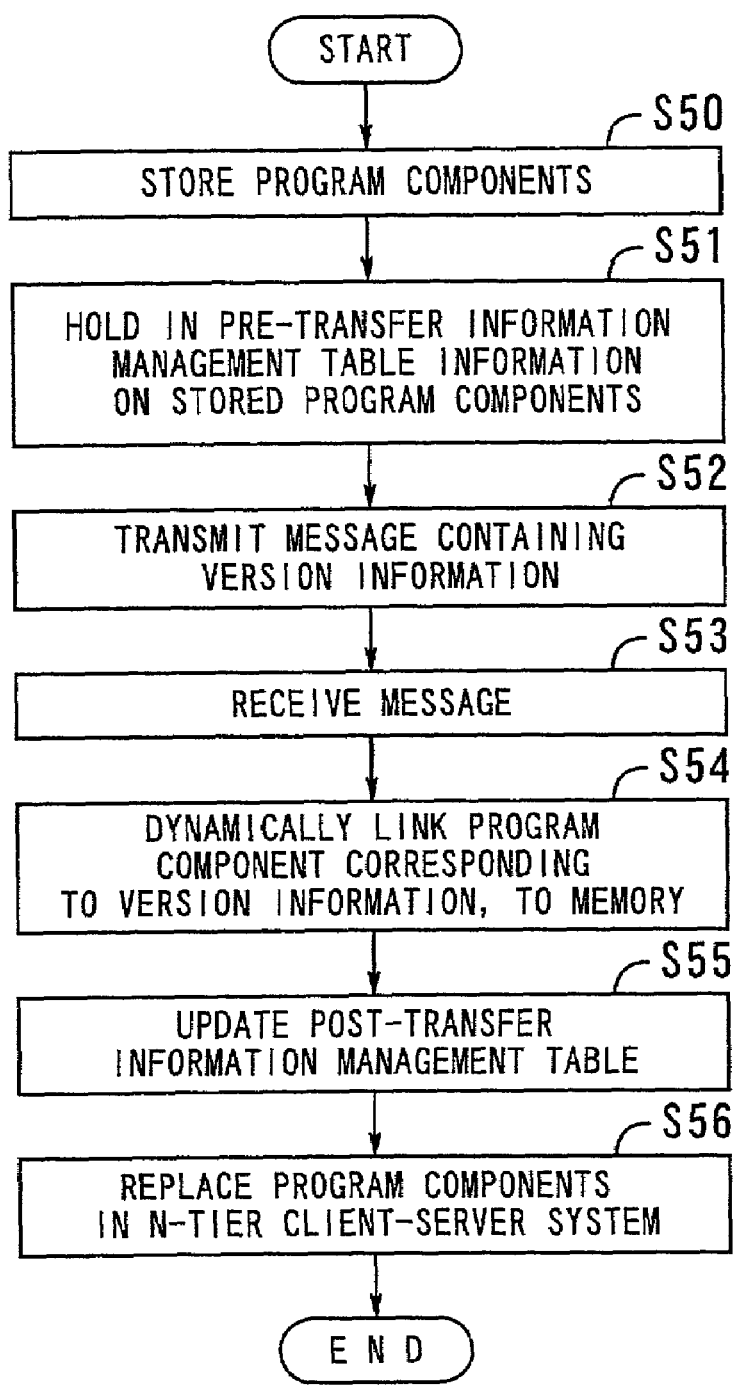
FIG. 20 is a flow diagram illustrating a sequence of operations performed in each server apparatus for changing versions of distributed objects in an N-tier client-server system.

FIG. 20 is a flow diagram illustrating a sequence of operations performed in each server apparatus for changing versions of distributed objects in an N-tier client-server system.

In step S50, the server apparatus stores one or more program components for use in loading or replacement. In step S51, the server apparatus holds in a pre-transfer information management table information on the one or more program components. In step S52, a client transmits a message containing information on a program version. In step S53, the server apparatus receives the message. In step S54, the server apparatus dynamically links one of the one or more program components corresponding to the program version, to a memory allocated to a process in which a program component which is to be replaced is executed, and calls the one of the one or more program components into execution. In step S55, the server apparatus holds in a post-transfer information management table information on at least one program component stored in the memory. In step S56, program components in the other server apparatuses in an N-tier client-server system are replaced in preparation for execution of program components in the other server apparatuses so as to maintain synchronization between program components loaded in the server apparatuses.

In particular, in the fourth embodiment of the present invention, the following operations are performed during execution of programs in each server apparatus.

(i) The post-transfer information management table further contains a reference count for each version of each program component. The reference count for each version of each program component is the number of current references to a function in the version of the program component (i.e., the number of executions in which a function in the version of the program component is currently referred to). A memory allocated to a process in which a first version of a program component is executed is automatically released from the first version of the program component, when a newer (second) version of the program component is loaded in the memory, and the first (older) version of the program component is not used.

(ii) Each message transmitted from a client or a server apparatus to another server apparatus contains an evaluation flag as well as the version information, where the evaluation flag indicates whether or not a version of a program component is under evaluation. When each server apparatus receives a message which contains an evaluation flag indicating that a version of a program component is under evaluation, the server apparatus executes the version of the program component in a separate process.

(iii) The component-version-information management table further contains an evaluation count for each version of each program component, where the evaluation count for each version of each program component indicates the number of evaluations which are currently performed on the version of the program component. When the evaluation count for a version of a program component is zero in a server apparatus, the server apparatus terminates execution of the version of the program component in the separate process.

(iv) The program components for use in loading or replacement and the information on the program components are set and managed by the management server.

(7) Advantages (i) As described above, according to the present invention, new software components can be dynamically loaded, without stopping transaction, in an N-tier client-server system in which distributed object computing is performed.

(ii) It is possible to change step by step a plurality of versions of a plurality of software components which are distributed over a plurality of computers when more than one version of a software component may coexist in each computer.

(iii) An unnecessarily used memory portion is released from an old version of a software component when completion of transaction processing for a client using the old version of the software component is confirmed. Therefore, system resources can be efficiently used.

(iv) When a software component is under evaluation, the software component is not executed in a process in which transaction processing is executed, and is instead executed in a separate process. Therefore, it is possible to load a new software component in a server apparatus without decrease in reliability.

(v) When evaluation of a software component is completed, the software component is automatically loaded into a memory which is allocated to a process created for transaction, and then transaction is started. In addition, when transaction processing executed in a separate process is completed, the unnecessary (separate) process is terminated. Therefore, system resources can be efficiently used.

(vi) Software components are centrally controlled in a repository server, and software transfer is made. Therefore, it is possible to simplify and automate the operation of updating software, which is usually complicated in an N-tier client-server environment. In addition, the quality of the operation can be improved.

(8) Other Matters (i) Although CORBA is used as an object request broker (ORB) in the above embodiments, any other object request broker can be used. In addition, although applications of the present invention to N-tier client-server systems are mainly explained in the above embodiments, the present invention can be applied to dynamic loading or replacement of software in any other information communication networks.

(ii) The operations and the functions of the server apparatus in each of the first to fourth embodiments can be realized by using at least one product with an information processing apparatus such as a computer, e.g., by installing a computer-readable medium in a computer. The product is such that when the product is used with an information processing apparatus, the product is able to output control information which directs the information processing apparatus to realize one or more functions of the server apparatus in each of the first to fourth embodiments. The product may be a computer-readable medium which stores a program which directs the computer to realize one or more functions of the server apparatus in each of the first to fourth embodiments. The computer-readable medium may be a semiconductor storage device such as a ROM, a magnetic storage medium such as a floppy disc or a hard disk, or a CD-ROM, a CD-R, a DVD-ROM, a DVD-RAM, a DVD-R, or the like. Alternatively, the product may be a programmed hardware logic circuit such as a custom LSI, or realized by a combination of hardware and software. The above product can be put into the market. Otherwise, the program data which directs the computer to realize one or more functions of the server apparatus in each of the first to fourth embodiments can be transferred through a communication network from a storage device included in a computer system to another computer system. When executing the program in a computer system, for example, the program stored in a hard disk drive may be loaded into a main memory of the computer system.

(iii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iv) In addition, all of the contents of the Japanese patent application, No.2000-077814 are incorporated into this specification by reference.

What is claimed is:

1. An information processing system including at least one terminal apparatus and at least one program execution apparatus wherein each of said at least one terminal apparatus includes a
message transmitting unit which transmits a message containing version information indicating a program version for a program being executed;
wherein the version information is defined in different namespaces, when the program being executed is written in programming language C++, for preventing a collision of names of functions and variables in different versions of the program; and each of said at least one program execution apparatus includes,
a message receiving unit which receives said message containing version information indicating a program version, from one of said at least one terminal apparatus,
a program storing unit which stores one or more program components,
a pre-transfer information management table which holds information on said one or more program components stored in said program storing unit,
a program memory unit which is allocated to an activated process, and temporarily stores at least one program component transferred from said program storing unit,
a post-transfer information management table which holds information on said at least one program component stored in said program memory unit, and
a program executing unit which dynamically links one of said one or more program components corresponding to said version information contained in said message received by said message receiving unit, to said program memory unit, so as to enable execution of said one of said one or more program components in said process, and which changes, without stopping transaction processing, a plurality of versions of a plurality of software components which are distributed over a plurality of the terminal apparatuses when more than one version of a software component may coexist in each of the terminal apparatus.

2. An information processing system according to claim 1, wherein said post-transfer information management table indicates for each of said at least one program component a reference count which indicates the number of executions in which said each of said at least one program component are currently referred to.

3. An information processing system according to claim 2, wherein said program executing unit removes one of said at least one program component from said program memory unit when said reference count for said one of said at least one program component is zero, and information on a newer version of said one of said at least one program component is included in the said post-transfer information management table.

4. An information processing system according to claim 1, wherein said message received by said message receiving unit further contains an evaluation flag which indicates whether or not a program component is under evaluation.

5. An information processing system according to claim 4, wherein said program executing unit executes said program component for which said evaluation flag is contained in said message, in a separate process, when the evaluation flag indicates that said program component for which said evaluation flag is contained in said message is under evaluation.

6. An information processing system according to claim 1, wherein said post-transfer information management table indicates for each of said at least one program component an evaluation count which indicates the number of evaluations which are currently performed on said each of said at least one program component.

7. An information processing system according to claim 6, wherein said program executing unit terminates execution of one of said at least one program component in a separate process when said evaluation count corresponding to said one of said at least one program component is zero.

8. An information processing system according to claim 1, further comprising a management apparatus which sets and manages said one or more program components stored in said program storing unit and said information on said one or more program components held in said pre-transfer information management table.

9. A program execution apparatus, comprising:
a message receiving unit which receives a message containing version information indicating a program version for a program being executed;
wherein the version information is defined in different namespaces, when the program being executed is written in programming language C++, for preventing a collision of names of functions and variables in different versions of the program;
a program storing unit which stores one or more program components;
a pre-transfer information management table which holds information on said one or more program components stored in said program storing unit;
a program memory unit which is allocated to an activated process, and temporarily stores at least one program component transferred from said program storing unit;
a post-transfer information management table which holds information on said at least one program component stored in said program memory unit; and
a program executing unit which dynamically links one of said one or more program components corresponding to said version information contained in said message received by said message receiving unit, to said program memory unit, so as to enable execution of said one of said one or more program components, and which changes, without stopping transaction processing, a plurality of versions of a plurality of software components which are distributed over a plurality of computers when more than one version of a software component may coexist in each of the computer.

10. A distributed processing system including at least one client apparatus and a plurality of server apparatuses, and realizing an N-tier client-server environment, wherein
each of said at least one client apparatus includes a client stub processing unit which executes stub processing of a first message which contains version information indicating a program version for a program being executed;
wherein the version information is defined in different namespaces, when the program being executed is written in programming language C++, for preventing a collision of names of functions and variables in different versions of the program; and
each of said plurality of server apparatuses includes,
a server skeleton processing unit which executes skeleton processing of said first message containing version information indicating a program version,
a distributed-object storing repository which stores one or more distributed objects,
a pre-transfer information management table which holds information on said one or more distributed objects stored in said distributed-object storing repository,
a memory which is allocated to an activated process, and temporarily stores at least one distributed object transferred from said distributed-object storing repository,
a post-transfer information management table which holds information on said at least one distributed object stored in said memory,
a distributed object execution control unit which dynamically links one of said one or more distributed objects corresponding to said version information contained in said first message of which skeleton processing is executed by said server skeleton processing unit, to said memory, so as to enable execution of at least one function in said one of said one or more distributed objects, and which changes, without stopping transaction processing, a plurality of versions of a plurality of software components which are distributed over a plurality of the client apparatuses when more than one version of a software component may coexist in each of the client apparatus, and
a server stub processing unit which executes stub processing of a second message containing said version information so as to transmit the second message to another of said plurality of server apparatuses.

11. A distributed processing system according to claim 10, wherein said post-transfer information management table indicates for each of said at least one distributed object a reference count which indicates the number of executions in which said each of said at least one distributed object are currently referred to.

12. A distributed processing system according to claim 11, wherein said distributed object execution control unit removes one of said at least one distributed object from said memory when said reference count for said one of said at least one distributed object is zero, and information on a newer version of said one of said at least one distributed object is included in the said post-transfer information management table.

13. A distributed processing system according to claim 10, wherein each of said first and second messages further contains an evaluation flag which indicates whether or not a distributed object is under evaluation.

14. A distributed processing system according to claim 13, wherein said distributed object execution control unit executes said distributed object for which said evaluation flag is contained in said first message, in a separate process, when the evaluation flag indicates that said program component for which said evaluation flag is contained in said first message is under evaluation.

15. A distributed processing system according to claim 10, wherein said post-transfer information management table indicates for each of said at least one distributed object an evaluation count which indicates the number of evaluations which are currently performed on said each of said at least one distributed object.

16. A distributed processing system according to claim 15, wherein said distributed object execution control unit terminates execution of one of said at least one distributed object in a separate process when said evaluation count corresponding to said one of said at least one distributed object is zero.

17. A distributed processing system according to claim 10, further comprising a management server which sets and manages said one or more distributed objects stored in said distributed-object storing repository arid said information on said one or more distributed objects held in said pre-transfer information management table.

18. A server apparatus comprising:
a server skeleton processing unit which executes skeleton processing of a first message containing version information indicating a program version for a program being executed;
wherein the version information is defined in different namespaces, when the program being executed is written in programming language C++, for preventing a collision of names of functions and variables in different versions of the program;

a distributed-object storing repository which stores one or more distributed objects;

a pre-transfer information management table which holds information on said one or more distributed objects stored in said distributed-abject storing repository;

a memory which is allocated to an activated process, and temporarily stores at least one distributed object transferred from said distributed-object storing repository;

a post-transfer information management table which holds information on said at least one distributed object stored in said memory;

a distributed object execution control unit which dynamically links one of said one or more distributed objects corresponding to said version information contained in said first message of which skeleton processing is executed by said server skeleton processing unit, to said memory, so as to enable execution of at least one function in said one of said one or more distributed objects, and which changes, without stopping transaction processing, a plurality of versions of a plurality of software components which are distributed over a plurality of the client apparatuses when more than one version of a software component may coexist in each of the client apparatus; and a server stub processing unit which executes stub processing of a second message containing said version information so as to transmit the second message to another server apparatus.

19. A method for updating a program component loaded in a server in an N-tier client-server environment comprising the steps of:
   (a) storing in said server one or more program components;
   (b) holding information on said one or more program components stored in said server, in a pre-transfer information management table;
   (c) transmitting a first message containing version information indicating a program version for a program being executed, from a client to said server;
   wherein the version information is defined in different namespaces, when the program being executed is written in programming language C++, for preventing a collision of names of functions and variables in different versions of the program;
   (d) receiving said first message by said server;
   (e) dynamically linking one of said one or more program components corresponding to said version information contained in said first message, to a memory which is allocated to an activated process in said server, so as to enable execution of said one of said one or more program components in said process;
   (f) changing, without stopping transaction processing, a plurality of versions of a plurality of software components which are distributed over a plurality of the clients when more than one version of a software component may coexist in each of the clients;
   (g) holding in a post-transfer information management table information on at least one program component stored in said memory; and
   (h) transmitting to another server a second message containing said version information.

20. A method according to claim 19, wherein said post-transfer information management table indicates for each of said at least one program component a reference count which indicates the number of executions in which said each of said at least one program component are currently referred to.

21. A method according to claim 20, further comprising the step of,
   (i) removing one of said at least one program component from said memory when said reference count for said one of said at least one program component is zero, and information on a newer version of said one of said at least one program component is included in the said post-transfer information management table.

22. A method according to claim 19, wherein each of said first and second messages further contains an evaluation flag which indicates whether or not a program component is under evaluation.

23. A method according to claim 22, wherein, in said step (f), said program component for which said evaluation flag is contained in said first message is executed in a separate process when the evaluation flag indicates that said program component for which said evaluation flag is contained in said first message is under evaluation.

24. A method according to claim 19, wherein said post-transfer information management table indicates for each of said at least one program component an evaluation count which indicates the number of evaluations which are currently performed on said each of said at least one program component.

25. A method according to claim 24, further comprising the step of,
   (j) terminating execution of one of said at least one program component in a separate process when said evaluation count corresponding to said one of said at least one program component is zero.

26. A method according to claim 19, further comprising the step of,
   (k) setting and managing said one or more program components stored in said server and said information on said one or more program components held in said pre-transfer information management table, by using a management apparatus.

* * * * *